United States Patent
Tiruvannamalai et al.

(10) Patent No.: US 11,444,277 B2
(45) Date of Patent: Sep. 13, 2022

(54) ANODES, SECONDARY BATTERIES INCLUDING THE SAME, AND METHODS OF MAKING ANODES

(71) Applicant: SES Holdings Pte. Ltd., Singapore (SG)

(72) Inventors: Arunkumar Tiruvannamalai, Waltham, MA (US); Yongkyu Son, Bedford, MA (US); Jacqueline Hong, Stoneham, MA (US); Mackenzie King, Essex, MA (US); Qichao Hu, Arlington, MA (US); Robert Graves, Methuen, MA (US); Jody Klaassen, Minneapolis, MN (US)

(73) Assignee: SES Holdings Pte. Ltd., Singapore (SG)

(*) Notice: Subject to any disclaimer, the term of this patent is extended or adjusted under 35 U.S.C. 154(b) by 102 days.

(21) Appl. No.: 16/803,286

(22) Filed: Feb. 27, 2020

(65) Prior Publication Data
US 2020/0280063 A1    Sep. 3, 2020

Related U.S. Application Data

(60) Provisional application No. 62/833,495, filed on Apr. 12, 2019, provisional application No. 62/833,507, (Continued)

(51) Int. Cl.
| | |
|---|---|
| H01M 4/40 | (2006.01) |
| H01M 4/04 | (2006.01) |
| H01M 4/74 | (2006.01) |
| H01M 4/80 | (2006.01) |
| H01M 4/66 | (2006.01) |

(52) U.S. Cl.
CPC .......... H01M 4/40 (2013.01); H01M 4/0404 (2013.01); H01M 4/0421 (2013.01); (Continued)

(58) Field of Classification Search
CPC .... H01M 4/40; H01M 4/0404; H01M 4/0421; H01M 4/661; H01M 4/742; H01M 4/80
See application file for complete search history.

(56) References Cited

U.S. PATENT DOCUMENTS

| 4,056,885 A | 11/1977 | Rao |
| 6,168,884 B1 | 1/2001 | Neudecker et al. |
| (Continued) | | |

FOREIGN PATENT DOCUMENTS

| CN | 104600365 A | 5/2015 |
| JP | 200380494 A | 3/2003 |
| (Continued) | | |

OTHER PUBLICATIONS

EPO machine generated English translation of WO-2020/054081-A1 (Year: 2020).*

*Primary Examiner* — Christopher P Domone
*Assistant Examiner* — Kimberly Wyluda
(74) *Attorney, Agent, or Firm* — Downs Rachlin Martin PLLC

(57) ABSTRACT

Alkali metal secondary batteries that include anodes constructed from alkali metal foil applied to only one side of a porous current collector metal foil. Openings in the porous current collectors permit alkali metal accessibility on both sides of the anode structure. Such anode constructions enable the utilization of lower-cost and more commonly available alkali metal foil thickness, while still achieving high cell cycle life at a significantly reduced cost. Aspects of the present disclosure also include batteries with porous current collectors having increased volumetric and gravimetric energy densities, and methods of manufacturing anodes with porous current collectors.

32 Claims, 21 Drawing Sheets

Related U.S. Application Data filed on Apr. 12, 2019, provisional application No. 62/833,500, filed on Apr. 12, 2019, provisional application No. 62/833,501, filed on Apr. 12, 2019, provisional application No. 61/833,487, filed on Apr. 12, 2019, provisional application No. 62/833,499, filed on Apr. 12, 2019, provisional application No. 62/812,398, filed on Mar. 1, 2019, provisional application No. 62/812,441, filed on Mar. 1, 2019, provisional application No. 62/812,482, filed on Mar. 1, 2019, provisional application No. 62/812,454, filed on Mar. 1, 2019, provisional application No. 62/812,302, filed on Mar. 1, 2019.

(52) U.S. Cl.
CPC .......... *H01M 4/661* (2013.01); *H01M 4/742* (2013.01); *H01M 4/80* (2013.01)

(56) References Cited

U.S. PATENT DOCUMENTS

| | | |
|---|---|---|
| 6,265,099 B1 | 7/2001 | Gauthier et al. |
| 6,402,795 B1 | 6/2002 | Chu et al. |
| 6,447,957 B1 | 9/2002 | Sakamoto et al. |
| 9,930,776 B2 | 3/2018 | Kohiki |
| 2002/0013986 A1 | 2/2002 | Ahn et al. |
| 2005/0158574 A1 | 7/2005 | Suzuki et al. |
| 2005/0191545 A1 | 9/2005 | Bowles et al. |
| 2009/0246629 A1 | 10/2009 | Nagai et al. |
| 2010/0055571 A1 | 3/2010 | LeGuenne et al. |
| 2012/0208411 A1 | 8/2012 | Krokoszinski et al. |
| 2012/0214059 A1 | 8/2012 | Bauer |
| 2013/0309579 A1 | 11/2013 | Shimp et al. |
| 2016/0172661 A1 | 6/2016 | Fischer et al. |
| 2016/0261000 A1 | 9/2016 | Zhang et al. |
| 2017/0040605 A1 | 2/2017 | Hwang et al. |
| 2017/0062832 A1 | 3/2017 | Bucur et al. |
| 2017/0301958 A1 | 10/2017 | Deng et al. |
| 2018/0019477 A1 | 1/2018 | Woo |
| 2018/0026271 A1 | 1/2018 | Oh et al. |
| 2018/0034038 A1* | 2/2018 | Rogren .............. H01M 4/0471 |
| 2019/0044097 A1 | 2/2019 | Yu et al. |

FOREIGN PATENT DOCUMENTS

| | | | |
|---|---|---|---|
| WO | 2018055970 A1 | 3/2018 | |
| WO | WO-2020054081 A1 * | 3/2020 | .......... H01M 10/052 |

\* cited by examiner

FIG. 15A
0.3mm, 40%
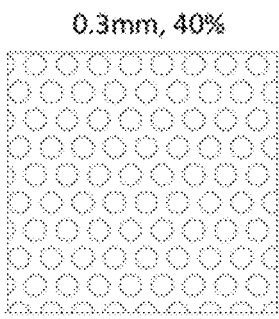
FIG. 15B
0.3mm, 55%
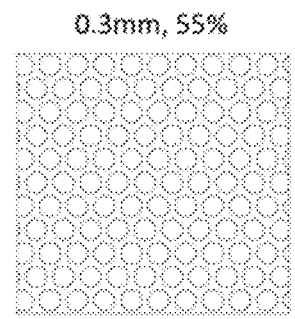
FIG. 15C
0.75mm, 55%
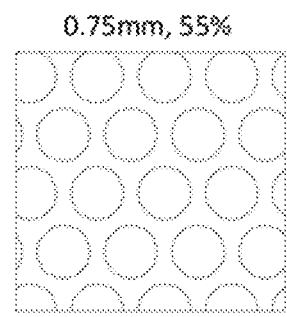
1.2mm, 55%     1.2mm, 70%     0.75mm, 70%     1.2mm, 80%
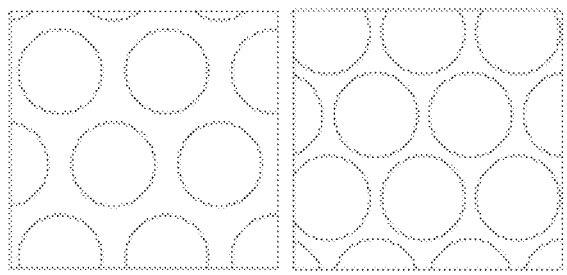 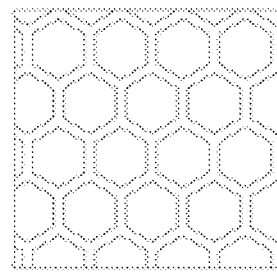 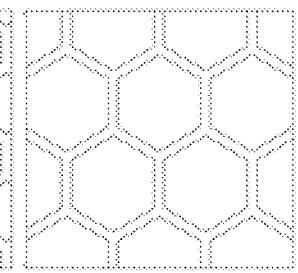
FIG. 15D     FIG. 15E     FIG. 15F     FIG. 15G

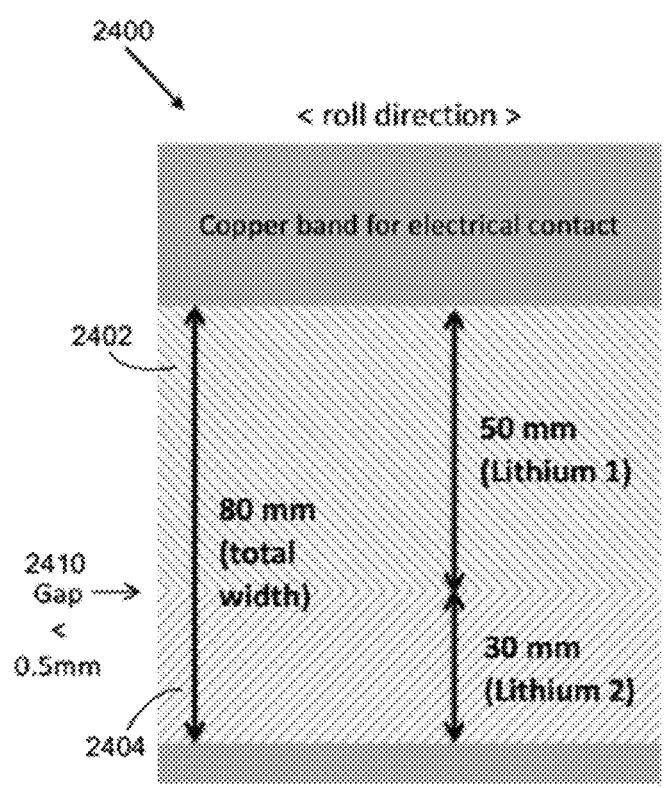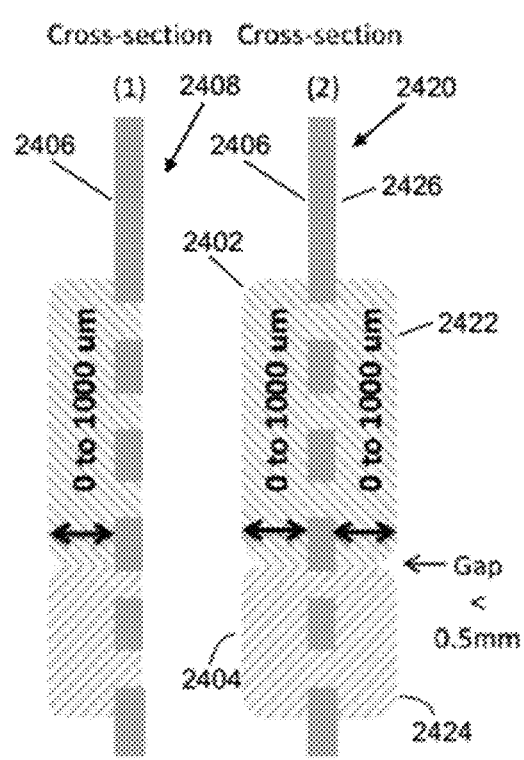
FIG. 24A   FIG. 24B   FIG. 24C

ANODES, SECONDARY BATTERIES INCLUDING THE SAME, AND METHODS OF MAKING ANODES

RELATED APPLICATION DATA

This application claims the benefit of priority of U.S. Provisional Patent Application Ser. No. 62/812,454, filed Mar. 1, 2019, and titled Method of Making Perforated Current Collector Using Carrier Film for Secondary Lithium Battery; U.S. Provisional Patent Application Ser. No. 62/833,487, filed Apr. 12, 2019, and titled Method of Making Perforated Current Collector Using Carrier Film for Secondary Lithium Battery; U.S. Provisional Patent Application Ser. No. 62/812,398, filed Mar. 1, 2019, and titled Perforated Current Collector Design for Lithium Metal Anode and Secondary Battery Containing the Same; U.S. Provisional Patent Application Ser. No. 62/833,495, filed Apr. 12, 2019, and titled Perforated Current Collector Design for Lithium Metal Anode and Secondary Battery Containing the Same; U.S. Provisional Patent Application Ser. No. 62/812,482, filed Mar. 1, 2019, and titled Perforated Current Collector Made Via Photo-Lithography for Secondary Lithium Battery; U.S. Provisional Patent Application Ser. No. 62/833,499, filed Apr. 12, 2019, and titled Perforated Current Collector Made Via Photo-Lithography for Secondary Lithium Battery; U.S. Provisional Patent Application Ser. No. 62/812,441, filed Mar. 1, 2019, and titled Method of Making Perforated Current Collector Using a Perforated Carrier Film for Back-Side Lithium Extrusion and Planarization for Secondary Lithium Battery; U.S. Provisional Patent Application Ser. No. 62/833,500, filed Apr. 12, 2019, and titled Method of Making Perforated Current Collector Using a Perforated Carrier Film for Back-Side Lithium Extrusion and Planarization for Secondary Lithium Battery; U.S. Provisional Patent Application Ser. No. 62/812,302, filed Mar. 1, 2019, and titled Large Format Anodes For Secondary Lithium Batteries; U.S. Provisional Patent Application Ser. No. 62/833,501, filed Apr. 12, 2019, and titled Large Format Anodes For Secondary Lithium Batteries; U.S. Provisional Patent Application Ser. No. 62/833,507, filed Apr. 12, 2019, and titled Large Format Anodes For Secondary Lithium Batteries. Each of these applications is incorporated by reference herein in their entirety.

FIELD OF THE DISCLOSURE

The present disclosure generally relates to the field of anodes for secondary batteries. In particular, the present disclosure is directed to alkali metal anodes with porous current collectors, secondary batteries containing the same and methods of manufacturing the same.

BACKGROUND

Secondary (also referred to as rechargeable) lithium metal batteries provide great promise for the next generation of energy storage devices due to the significantly higher energy density they provide. Unlike conventional lithium ion batteries, which contain anodes (also referred to as negative electrodes) formed from an intercalant material, such as graphite, lithium metal battery anodes are formed from lithium metal, for example, thin sheets of lithium metal foil coupled to current collectors. The intercalation anodes of lithium ion batteries only provide host structures for lithium ions and do not contribute to energy storage. Lithium metal battery anodes, by contrast, are formed, in part, by lithium metal, which contributes to energy storage, thereby significantly increasing volumetric and gravimetric energy density. During charging and discharging cycles of a lithium metal battery, lithium metal is deposited onto the anode during charge and stripped from the anode during discharge.

The anode of a secondary lithium battery typically contains a lithium foil applied to both sides of a copper foil current collector. Testing has shown that performance of the battery tends to improve as the thickness of the lithium foil is decreased, for example, cell cycle life tends to optimize, and volumetric and gravimetric energy density tend to increase, as the thickness of the lithium foil is decreased, for example, to a thickness of lithium foil on each side of the current collector of less than or equal to approximately 20 um. However, it is challenging to economically produce such thin layers of lithium foil with currently available lithium foil manufacturing processes, such as by traditional roll-milling processes, and it is particularly challenging to produce wider rolls, for example, greater than 55 mm widths. With traditional roll-milling processes, the relatively soft and reactive nature of lithium results in low yield and, consequently high cost, to manufacture extremely thin lithium metal foil, e.g., a thickness of less than or equal to approximately 10-20 um. The manufacturing challenges also restrict the maximum available width of extremely thin lithium metal foil, which in turn limits the areal dimensions of secondary lithium metal battery cells that can be produced, thereby limiting the energy capacity of the cell.

SUMMARY OF THE DISCLOSURE

In an implementation, the present disclosure is directed to a method of manufacturing an anode, including receiving an alkali metal foil; receiving a porous current collector foil having first and second opposing sides and a webbed structure defining openings each having a volume; and laminating the alkali metal foil and porous current collector foil together at the first side of the porous current collector, wherein the laminating includes forming extruded portions of the alkali metal foil that extend through the openings from the first side to the second side and that substantially fill the volumes of the openings.

In one or more embodiments of the method, the laminating step includes completely filling the volumes with the extruded portions.

In one or more embodiments of the method, the laminating step includes extending the extruded portions until they are at least substantially flush with the second side of the porous current collector foil.

In one or more embodiments of the method, the openings in the porous current collector foil define a percent open area that is greater than 80%.

In one or more embodiments of the method, the openings in the porous current collector foil define a percent open area that is greater than 60%.

In one or more embodiments of the method, the openings in the porous current collector foil define a percent open area that is greater than 40%.

In one or more embodiments of the method, the openings have a maximum width that is greater than 0.5 mm.

In one or more embodiments of the method, the openings have a circular or polygon shape and are in a close packed arrangement.

In one or more embodiments of the method, a thickness of the current collector foil is from 4 um to 20 um.

In one or more embodiments of the method, the webbed structure of the porous current collector has a minimum web width extending between adjacent ones of the openings, wherein the minimum web width is less than 1 mm.

In one or more embodiments of the method, the webbed structure of the porous current collector has a minimum web width extending between adjacent ones of the openings, wherein the minimum web width is less than 0.25 mm.

In one or more embodiments of the method, the webbed structure of the porous current collector has a minimum web width extending between adjacent ones of the openings, wherein the minimum web width is less than 0.15 mm.

In one or more embodiments of the method, forming the openings in the current collector using one or more of a perforating process, a rotary hole punch process, a rotary die process, a rotary kiss-cut process, a photolithography process, a photoetching process, an electroforming process, a laser cutting process, and a metal mesh weaving process.

In one or more embodiments of the method, coating the second side of the current collector with an alkali metal coating.

In one or more embodiments of the method, the step of coating includes one or more of vapor deposition, electrodeposition, slot-die coating, dip coating, micro gravure, flexography, or plating during initial charging of a cell containing the anode.

In one or more embodiments of the method, alkali metal foil is laminated to only one side of the current collector metal foil.

In one or more embodiments of the method, the alkali metal foil has a thickness in the range of 1 um to 1000 um.

In one or more embodiments of the method, the alkali metal foil has a width that is greater than 55 mm.

In one or more embodiments of the method, the laminating step includes laminating a plurality of rows of the alkali metal foil in a closely-spaced parallel arrangement across the porous current collector foil to form a wide-format anode having a width in the range of 55 mm to 300 mm.

In one or more embodiments of the method, the alkali metal foil is a first alkali metal foil, the method further comprising laminating a second alkali metal foil and the porous current collector foil together at the second side of the porous current collector.

In some aspects, the present disclosure is directed to a method of manufacturing an anode, including receiving at least one carrier film, a current collector metal foil having first and second opposing sides, and an alkali metal foil; laminating the at least one carrier film to the second side of the current collector metal foil to form a carrier film-current collector foil laminate; forming a plurality of openings in the carrier film-current collector foil laminate to form a porous carrier film-current collector foil laminate; laminating the alkali metal foil to the first side of the current collector metal foil, wherein the laminating the alkali metal foil includes forming extruded portions of the alkali metal foil that extend through the openings.

In one or more embodiments of the method, the plurality of openings each define a volume, further wherein the step of laminating the alkali metal foil to the first side of the current collector metal foil includes completely filling the volumes with the extruded portions.

In one or more embodiments of the method, the step of laminating the alkali metal foil to the first side of the current collector metal foil includes extending the extruded portions until they are at least substantially flush with the second side of the current collector metal foil.

In one or more embodiments of the method, the step of laminating the alkali metal foil includes extending the extruded portions through an entire thickness of the current collector metal foil and through at least a portion of a thickness of the at least one carrier film.

In one or more embodiments of the method, the at least one carrier film has a first side contacting the current collector metal foil and a second opposing side, wherein the step of laminating the alkali metal foil includes extending the extruded portions until ends of the extruded portions are substantially flush with the second side of the at least one carrier film.

In one or more embodiments of the method, the alkali metal foil is a first alkali metal foil, the method further including delaminating the at least one carrier film from the current collector metal foil; and laminating a second alkali metal foil to the second side of the current collector metal foil.

In one or more embodiments of the method, delaminating the at least one carrier film from the current collector metal foil leaving the extruded portions standing proud of the second side of the current collector.

In one or more embodiments of the method, planarizing the extruded portions across the second side of the porous current collector.

In one or more embodiments of the method, determining an extent of planarization of the extruded portions with a planarization monitoring system.

In one or more embodiments of the method, generating a planarization feedback signal according to the determined extent of planarization and sending the planarization feedback signal to a planarizing system to control an extent of the planarization.

In one or more embodiments of the method, the step of determining an extent of planarization includes execution of a machine vision algorithm configured to process images of the porous current collector to determine an extent of planarization of the extruded portions.

In one or more embodiments of the method, applying pressure to the extruded portions to reduce a height of the extruded portions and distribute the extruded portions across the second side of the porous current collector.

In one or more embodiments of the method, the at least one carrier film has a thickness that is selected to result in a target height of the extruded portions, the target height designed and configured for a target thickness and/or volume of the alkali metal on the second side of the current collector.

In one or more embodiments of the method, the at least one carrier film includes a first and second carrier film, wherein the step of forming the plurality of openings includes forming openings that extend through a thickness of the current collector metal foil and first carrier film, but that do not extend through the second carrier film.

In one or more embodiments of the method, delaminating the second carrier film prior to the step of laminating the alkali metal foil.

In one or more embodiments of the method, the delaminating step includes removing waste with the second carrier film, the waste created during the step of forming a plurality of openings.

In one or more embodiments of the method, applying an alkali metal coating to the second side of the current collector foil.

In one or more embodiments of the method, the step of applying an alkali metal coating includes one or more of vapor deposition, electrodeposition, slot-die coating, dip coating, micro gravure, flexography, or plating during initial charging of a cell containing the anode.

In one or more embodiments of the method, alkali metal foil is laminated to only one side of the current collector metal foil.

In one or more embodiments of the method, forming the openings in the current collector using one or more of a perforating process and a rotary die process.

In one or more embodiments of the method, the alkali metal foil has a thickness in the range of 1 um to 1000 um.

In one or more embodiments of the method, the alkali metal foil has a width that is greater than 55 mm.

In one or more embodiments of the method, the step of laminating the alkali metal foil includes laminating a plurality of rows of the alkali metal foil in a closely-spaced parallel arrangement across the porous current collector foil to form a wide-format anode having a width in the range of 55 mm to 300 mm.

In one or more embodiments of the method, determining an extent of extrusion of the alkali metal with an extrusion monitoring system.

In one or more embodiments of the method, generating an extrusion feedback signal according to the determined extent of extrusion and sending the extrusion feedback signal to a laminating roller set to control an extent of the extrusion.

In one or more embodiments of the method, the step of determining an extent of extrusion includes execution of a machine vision algorithm configured to process images of the at least one carrier film to determine an extent of extrusion of the extruded portions.

In one or more embodiments of the method, a thickness of the at least one carrier film is from 13 um to 300 um.

In some aspects, the present disclosure is directed to a method of manufacturing a lithium metal anode. The method includes receiving a multi-layer substrate that includes a current collector foil layer and at least one additional layer; applying a hole forming process to the multi-layer substrate to form a plurality of holes that extend through the current collector foil and at least partially through the at least one additional layer; laminating an alkali metal foil to a first side of the current collector foil; extruding the alkali metal foil through the holes to form a plurality of extruded portions of the alkali metal foil that extend at least partially through the at least one layer; and removing the at least one additional layer.

In one or more embodiments of the method, applying pressure to the extruded portions to distribute the extruded portions across a second side of the current collector.

In some aspects, the present disclosure is directed to a method of manufacturing an alkali metal anode. The method includes laminating an alkali metal foil to a first side of a porous current collector, the current collector having a plurality of holes that extend from the first side to a second opposing side of the current collector; extruding the alkali metal foil through the holes in the current collector to form extruded portions of the alkali metal, wherein the extruded portions extend at least to the second side and substantially fill the holes.

In one or more embodiments of the method, the alkali metal foil is a first alkali metal foil, the method further comprising laminating a second alkali metal foil to the second side of the porous current collector.

In one or more embodiments of the method, the holes in the porous current collector define a percent open area that is greater than 80%.

In one or more embodiments of the method, the holes in the porous current collector define a percent open area that is greater than 60%.

In one or more embodiments of the method, the holes in the porous current collector define a percent open area that is greater than 40%.

In one or more embodiments of the method, the holes have a maximum width that is greater than 0.5 mm.

In one or more embodiments of the method, the holes have a circular or polygon shape and are in a close packed arrangement.

In one or more embodiments of the method, a thickness of the current collector is from 4 um to 20 um.

In some aspects, the present disclosure is directed to a secondary battery, including an alkali metal anode, a cathode, and a separator; wherein the alkali metal anode was manufactured according to any of the foregoing embodiments.

In some aspects, the present disclosure is directed to a porous current collector metal foil for use with an alkali metal battery anode. The current collector includes first and second opposite sides and a webbed structure defining a plurality of openings extending between the first and second sides, wherein a percent open area defined by the plurality of openings is greater than 40% and the openings each have a width that is greater than 0.5 mm.

In one or more embodiments of the current collector, the webbed structure has a substantially uniform width.

In one or more embodiments of the current collector, the webbed structure is designed and configured to maximize the availability at the first side of an alkali metal foil laminated to the second side.

In one or more embodiments of the current collector, the webbed structure is designed and configured to maximize a uniformity of consumption of an alkali metal foil laminated to only one side of the current collector.

In some aspects, the present disclosure is directed to an anode for an alkali metal secondary battery, including a porous current collector foil having first and second opposing sides and a webbed structure defining openings each having a volume; and an alkali metal foil laminated to only one side of the porous current collector foil, wherein portions of the alkali metal foil extend through the openings from the first side to the second side and substantially fill the volumes of the openings.

In one or more embodiments of the anode, the openings in the porous current collector foil define a percent open area that is greater than 40%.

In one or more embodiments of the anode, the openings in the porous current collector foil define a percent open area that is from 80% to 90%.

In one or more embodiments of the anode, the openings have a width from 0.5 mm to 1.5 mm.

In one or more embodiments of the anode, the webbed structure of the porous current collector has a minimum web width extending between adjacent ones of the openings, wherein the minimum web width is less than 1 mm.

In one or more embodiments of the anode, the webbed structure of the porous current collector has a minimum web width extending between adjacent ones of the openings, wherein the minimum web width is less than 0.25 mm.

In one or more embodiments of the anode, the webbed structure of the porous current collector has a minimum web width extending between adjacent ones of the openings, wherein the minimum web width is less than 0.15 mm.

In one or more embodiments of the anode, the alkali metal foil has a thickness between 1 um and 1000 um.

In one or more embodiments of the anode, the alkali metal foil has a width that is greater than 55 mm.

In one or more embodiments of the anode, the anode includes a plurality of rows of the alkali metal foil positioned in a closely-spaced parallel arrangement across the porous current collector foil, wherein a width of the anode is between 55 mm to 300 mm.

In one or more embodiments of the anode, the alkali metal foil is laminated to the first side of the porous current collector foil, wherein extruded and planarized portions of the alkali metal foil are distributed along the second side of the porous current collector foil.

In one or more embodiments of the anode, the alkali metal foil is laminated to the first side of the porous current collector foil, further wherein the second side of the porous current collector foil includes a coating of the alkali metal.

In one or more embodiments of the anode, the coating was formed by one or more of vapor deposition, electrodeposition, slot-die coating, dip coating, micro gravure, flexography, or plating during initial charging of a cell containing the anode.

BRIEF DESCRIPTION OF THE DRAWINGS

For the purpose of illustrating the disclosure, the drawings show aspects of one or more embodiments of the disclosure. However, it should be understood that the present disclosure is not limited to the precise arrangements and instrumentalities shown in the drawings, wherein:

FIGS. 15A-15G illustrate example hole pattern designs for use in porous current collectors of the present disclosure;

FIGS. 24A and 24B illustrate an example wide-format anode structure with a plurality of alkali metal foils laminated to only one side of a porous current collector;

FIG. 24C illustrate an example wide-format anode structure with a plurality of alkali metal foils laminated to both sides of a porous current collector;

DETAILED DESCRIPTION

Aspects of the present disclosure include alkali metal secondary batteries that include anodes constructed from alkali metal foil applied to only one side of porous current collector metal foil. Openings in the porous current collectors permit alkali metal accessibility on both sides of the anode structure, permitting efficient construction of batteries with multiple cathode-anode pairs. Such anode constructions enable the utilization of lower-cost and more commonly available alkali metal foil thickness, for example, thicknesses greater than or equal to approximately 30 um, while still achieving high cell cycle life at a significantly reduced cost. Such constructions also enable the production of cells with larger areal dimensions because thicker alkali foils are available in wider widths, for example, widths greater than 55 mm. Such constructions also increase electrical conductivity between the alkali metal foil and current collector, thereby leading to increased high cell cycle life. Batteries with porous current collectors also have increased volumetric and gravimetric energy density.

Aspects of the present disclosure include methods of designing porous current collectors, for example, to optimize the design of the current collector for a given application or performance metric, such as maximized cell cycle life. One design variable is the hole pattern of the current collector, for example, selecting a hole pattern to maximize alkali metal access on both sides of the anode while providing good electrical contact between the current collector and alkali metal. Variables also include a shape of the holes, a size of the holes, an arrangement and spacing between the holes, a thickness of the current collector foil and an area percentage of the openings in the current collector foil.

Figure 1:
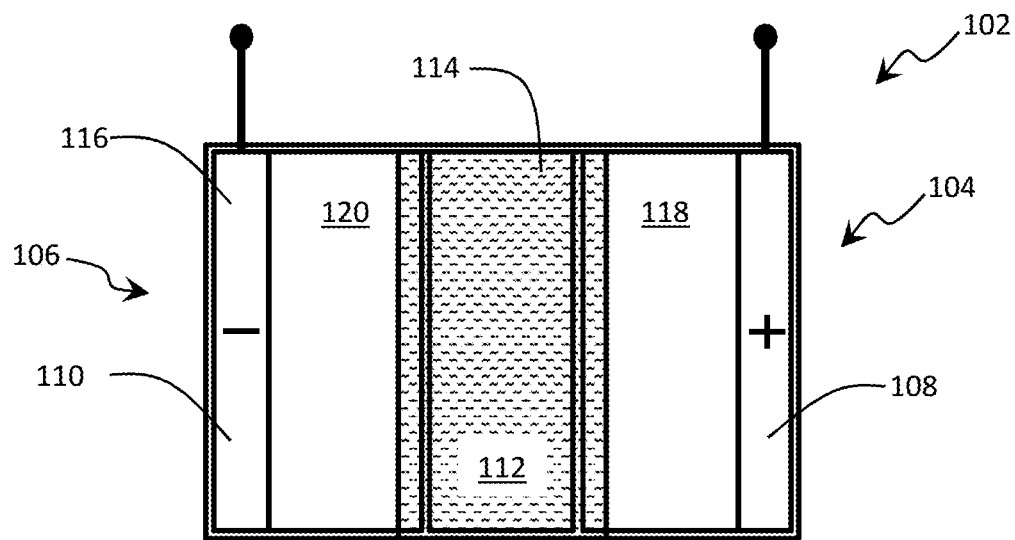
FIG. 1 illustrates one example of a cell of a secondary alkali metal battery.

FIG. 1 illustrates one example of a cell 102 of a secondary alkali metal battery. FIG. 1 illustrates only some basic functional components of cell 102. A real-world instantiation of the cell and/or battery will typically be embodied using either a wound or stacked construction including other components, such as electrical terminals, seal(s), thermal shutdown layer(s), and/or vent(s), among other things, that, for ease of illustration, are not shown in FIG. 1. In the illustrated example, cell 102 includes a spaced-apart cathode 104 and anode 106, and a pair of corresponding respective current collectors 108, 110. A porous dielectric separator 112 is located between the cathode 104 and anode 106 to electrically separate the cathode and anode but allow metal ions, such as lithium ions and ions of an electrolyte 114 to flow therethrough. The porous dielectric separator 112 and/or one, the other, or both of cathode 104 and anode 106 may also be impregnated with the electrolyte 114. The cell 102 includes a container 116 that contains the components of the cell.

The cathode and anode 104, 106 may comprise a variety of different structures and materials compatible with lithium-metal ions and electrolyte 114. Each of the current collectors 108, 110 may be made of any suitable electrically conducting material, such as copper or aluminum, or any combination thereof. The porous dielectric separator 112 may be made of any suitable porous dielectric material, such as a porous polymer, among others.

Cathode 104 includes a cathode material 118 that may be formed from a variety of materials known in the art such as a material of the general formula of $Li_xM_yO_z$, where M is a transition metal such as Co, Mn, Ni, V, Fe, or Cr, and x, y, z are chosen to satisfy valence requirements. In one or more embodiments, the cathode is a layered or spinel oxide material selected from the group comprising $LiCoO_2$, $Li(Ni_{1/3}Mn_{1/3}Co_{1/3})O_2$, $Li(Ni_{0.8}Co_{0.15}Al_{0.05})O_2$, $LiMn_2O_4$, $Li(Mn_{1.5}Ni_{0.5})_2O_4$, or their lithium rich versions. In one or more embodiments, the cathode material is $LiCoO_2$ (charged to 4.4V vs. Li metal), NCA or NCM (622, 811) (charged to 4.30V vs. Li metal).

Anode 106 may include an anode material 120, such as a thin alkali metal foil that, in the discharged state has a thickness in the range of 0 um-1000 um, or 10 um-100 um, or 30 um-60 um, or 20 um-40 um. Although FIG. 1 schematically shows anode material 120 adjacent current collector 110, as described more below, the anode material, e.g., sheets or films of alkali metal, may be disposed on one or both sides of the current collector. In another example, cell 102 may initially only include current collector 110 and alkali metal, e.g., lithium, initially stored in cathode 104 is deposited on the anode current collector 110 during initial cell charging to form anode 106. Further information regarding example materials and constructions of cell 102 can be found in PCT publication number WO 2017/214276, titled, "High energy density, high power density, high capacity, and room temperature capable 'anode-free' rechargeable batteries," which is incorporated by reference herein in its entirety.

Figure 2:
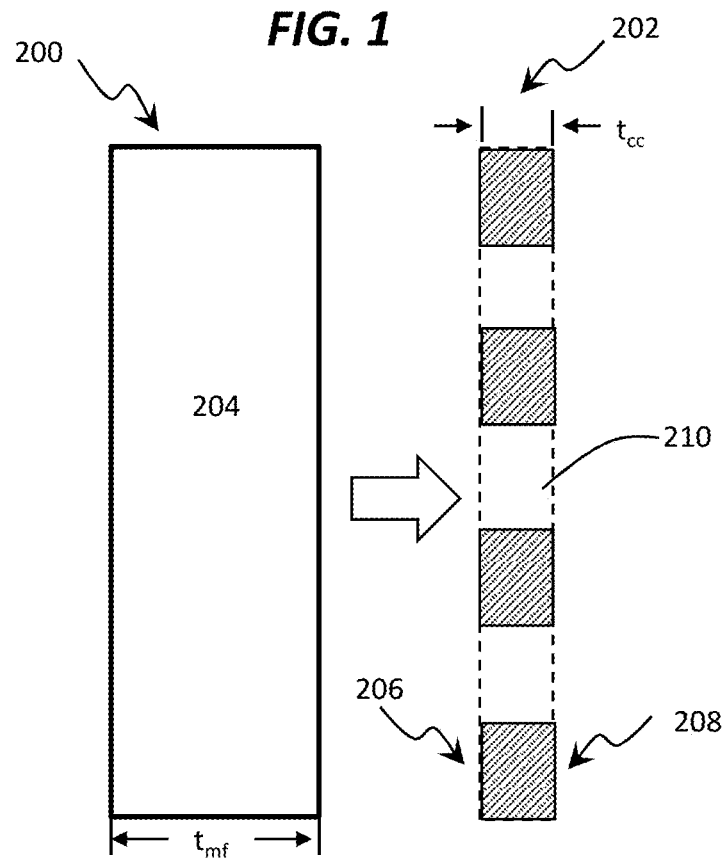
FIG. 2 illustrates an exploded cross-sectional side view of an example anode constructed from a porous current collector and alkali metal foil.
Figure 3:
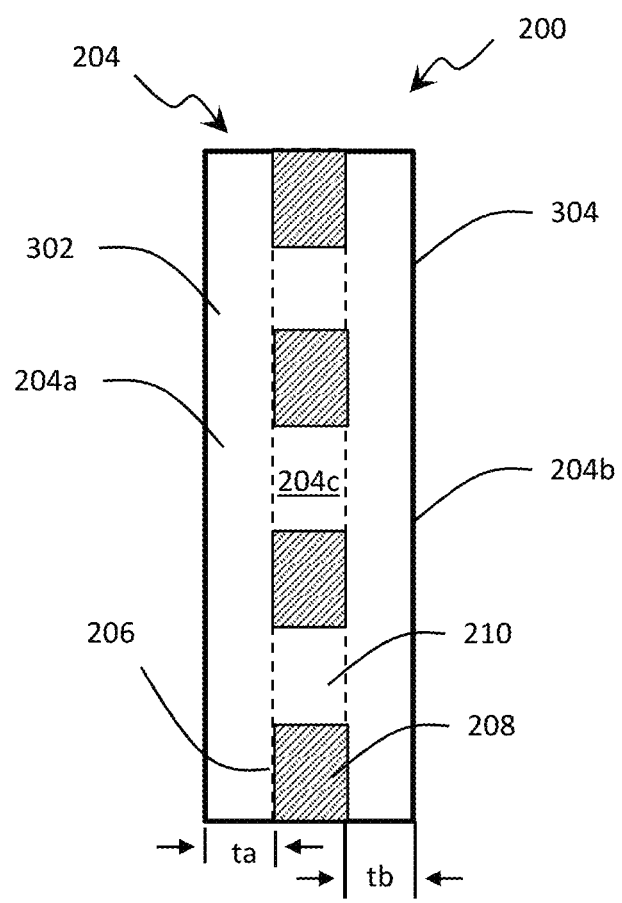
FIG. 3 illustrates an assembled cross-sectional side view of an example anode of FIG. 2.

FIGS. 2 and 3 illustrate exploded and assembled cross-sectional side views, respectively, of an example anode 200 made in accordance with the present disclosure. Anode 200 includes a porous current collector 202 having a thickness tCC extending between a first side 206 and an opposing second side 208 and a webbed structure defining a plurality of openings 210 (only one labeled) that extend from the first to the second side. In some examples, thickness tCC may be between 1 um and 100 um and in some examples, between 4 um and 20 um. Anode 200 also includes an alkali metal foil 204 having a thickness tMF. In some examples, thickness tMF may be between 1 um and 1,000 um, and in some examples, between 30 um and 60 um, and in some examples, greater than 20 um. Porous current collector 202 may be formed from any of a variety of materials, such as copper, nickel, titanium, and other refractory metals, and alloys that are stable against the corresponding alkali metal, e.g., lithium. Alkali metal foil may also be formed from any of a variety of materials, such as lithium, sodium, potassium, etc.

As illustrated in FIG. 2, anode 200 may be formed by applying alkali metal foil 204 to only one side, for example, first side 206, of porous current collector 202, by a variety of different processes described herein. FIG. 3 illustrates anode 200 in an assembled form. As alkali metal foil 204 was applied to first side 206, openings 210 of the porous current collector 202 allowed portions of the alkali metal to flow or extrude through the openings. FIG. 3 conceptually shows assembled anode 200 with a first portion 204a of the alkali metal foil 204 located on the first side 206 of the porous current collector, one or more second portions 204b located on the second side 208 of the current collector and third portions 204c of the alkali metal foil located in the openings 210 of the current collector. First portion 204a has a thickness ta and second portion 204b has a thickness tb, wherein ta+tb≈tMF. As described more below, the relative sizes of ta and tb may vary depending on the manufacturing technique used to assemble anode 200 and the desired design construction. For example, in some cases, tb may be approximately zero and alkali metal foil 204 may only be extruded partially through openings 210, or fully through the openings until extruded portions of the alkali metal foil are substantially flush with second side 208 of current collector 202. In other examples, portions of alkali metal foil 204 may be extruded beyond second side 208 such that they stand proud of the second side 208 and in some examples, the extruded portions may then be distributed across second side 208 of the current collector, forming second portion 204b of the alkali metal foil 204. As will be appreciated, while FIG. 3 conceptually shows assembled anode 200 as having a substantially flat first side 302 and second side 304, in some examples, second side 304 may have an undulating surface resulting from extruded portions of alkali metal foil 204 extending from each opening 210, and in some examples, the extruded portions are then distributed across second side 208. As described more below, in some examples, second side 208 may have a coating of alkali metal, such as the same species of alkali metal as alkali metal foil 204 to improve the uniformity of alkali metal across second side 208.

Figure 4:
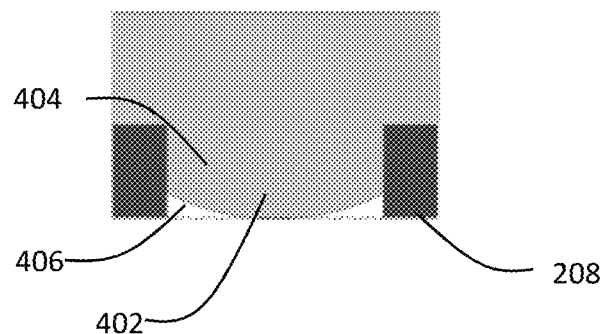
FIG. 4 illustrates a cross-sectional side view of a current collector opening and an extruded portion of alkali metal.
Figure 5:
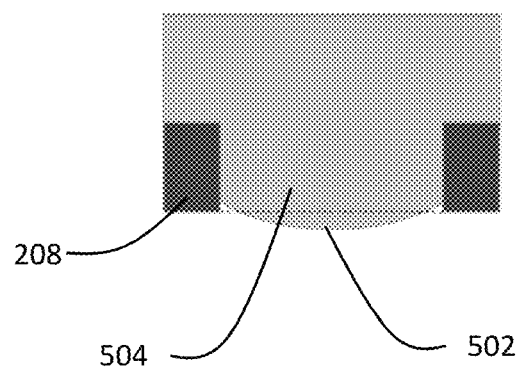
FIG. 5 illustrates another cross-sectional side view of a current collector opening and an extruded portion of alkali metal.

FIGS. 4 and 5 illustrate a cross-sectional side view of just one opening 210 of current collector 202 showing two example instantiations of anode 200. In the example shown in FIG. 4, alkali metal foil 204 has been extruded through openings 210 until an end 402 of an extruded portion 404 is substantially flush with second side 208 of current collector 202 and the extruded portion 404 substantially fills the volume defined by opening 210. In the example shown in FIG. 4, end 402 has a convex surface with a local maxima of the convex surface flush or coplanar with second side 208 and the convex surface and the openings 210 defining a small volume 406 of open space therebetween. FIG. 5 similarly shows an extruded portion 504 of the alkali metal foil 204 having an end 502 with a convex surface. In the example shown in FIG. 5 the alkali metal was extruded farther through current collector 202 such that end 502 stands proud of and protrudes beyond second side 208. In some examples, end 502 may be flattened so that the end of extruded portion 404 is substantially flat and flush with second side 208. In some examples, the example shown in FIG. 5 may provide higher battery cycle life performance than the example shown in FIG. 4 due to higher electrical conductivity between the alkali metal and current collector. In other examples, second side 208 of current collector 202 may be placed on a flat surface and application of an extrusion process to the example shown in FIG. 4 can continue until end 402 flattens against the flat surface and transitions from the convex shape shown in FIG. 4 to having a flat or planar end with volume 406 being reduced or substantially eliminated.

Figure 6:
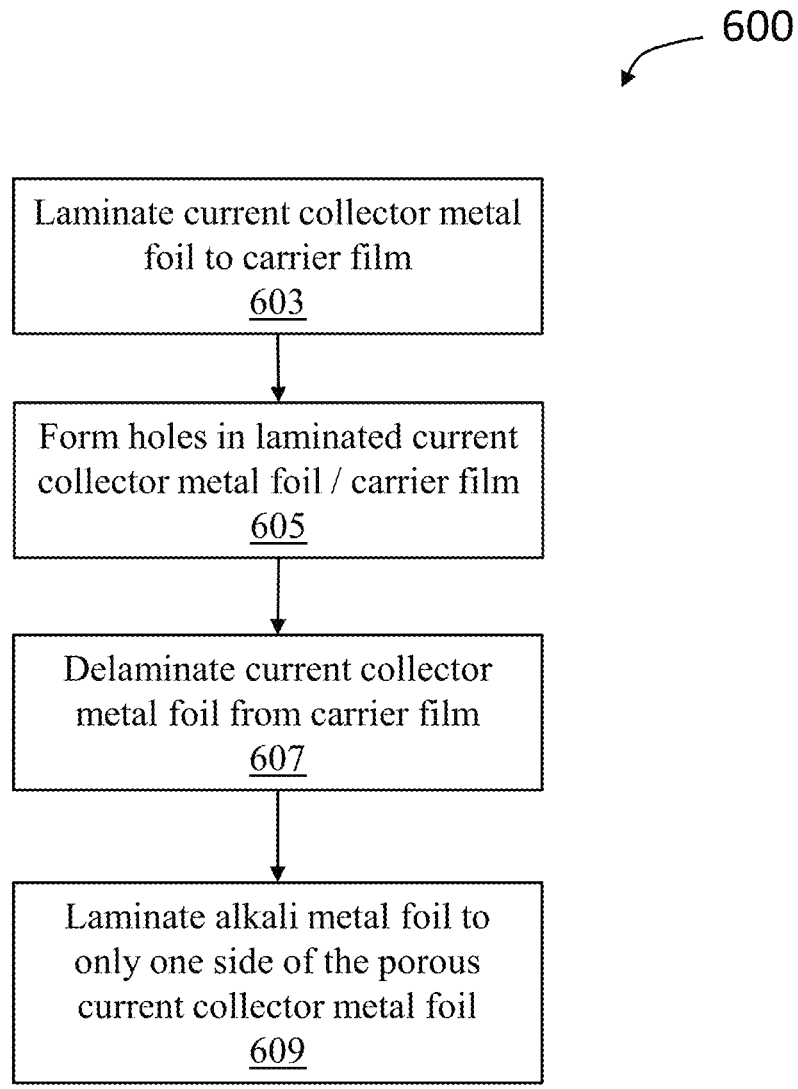
FIG. 6 is a flow-chart illustrating the steps of an example method of forming a porous current collector-alkali metal foil laminate for use as an anode in a secondary metal battery.
Figure 7:
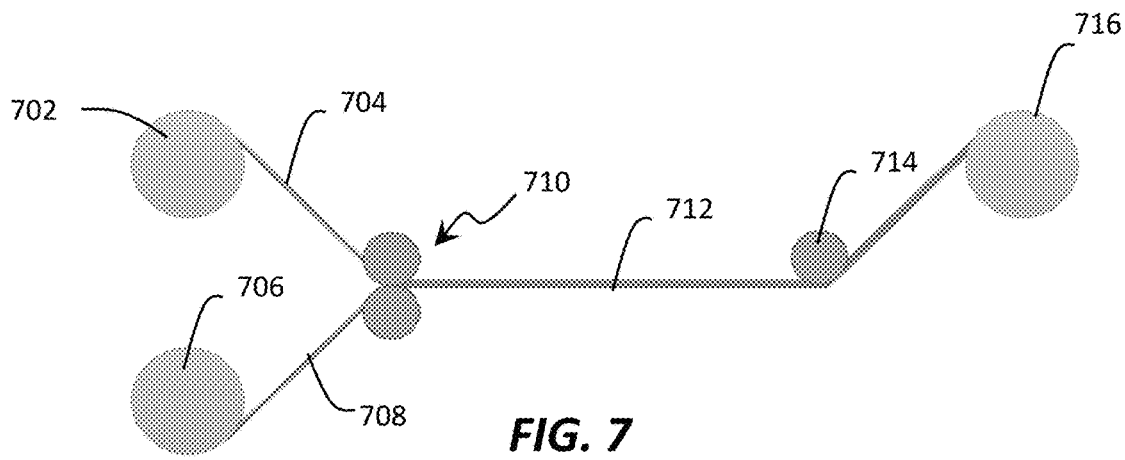
FIG. 7 shows an example roll-to-roll system for lamination of a carrier film and current collector metal foil.

FIG. 6 illustrates an example method 600 of forming a porous current collector-alkali metal foil laminate for use as an anode in a secondary metal battery. At step 603, method 600 may include laminating a carrier film to a metal foil, such as a copper metal foil. Carrier film may be formed from a variety of materials, such as a polyester, such as polyethylene terephthalate (PET), or any of a variety of other polymers, such as polyimide, polyethylene, polypropylene, polytetrafluoroethylene (PTFE), etc. Carrier film may also be formed from a variety of metals, such as copper, nickel, etc. In some examples, the thickness of the carrier film is greater than the thickness of the current collector (tCC) and may have a thickness in the range of 1 um to 300 um, and in some examples, between 25 um and 250 um, and in some examples, greater than 4 um. The current collector metal foil may be attached to the carrier film via a pressure sensitive or heat sensitive low-tack adhesive on the carrier film. In some examples, step 603 may include activating the carrier film, such as a PET carrier film, by a corona discharge and then coating the carrier film with an adhesive shortly thereafter. In one example, the adhesive may be a low temperature, heat sealable, polyester resin dissolved in a solvent, such as Adcote 40-3E dissolved in ethyl acetate. In one example, the coating is done using a number 8 wet film applicator rod, on the side of the carrier film activated by corona. The solvent is then removed by passing the film through a drying tunnel maintained at 200° F. The metal foil, e.g., 8 um thick copper foil, may then be laminated to the carrier film on the adhesive-coated side. In one example, the lamination includes running the metal foil against a heated roller maintained at, for example, above 180° F. during lamination. The lamination of the carrier film and metal foil may be automated, as shown in the example roll-to-roll system 700 illustrated in FIG. 7. In the example shown in FIG. 7, a roll 702 of metal foil 704 and a roll 706 of carrier film 708 may be fed through a laminating roller set 710 to laminate the two materials together. The laminating roller set may be heated to ensure good adhesion between the metal foil 704 and carrier film 708. The laminated metal/carrier 712 can be guided by roller 714 and collected on roll 716. In other examples, instead of joining a carrier film and current collector foil via lamination, the current collector may be formed directly on the surface of the carrier film by a variety of processes, such as electrodeposition, electroless plating, etc., and the current collector may remain adhered to the carrier film, for example, by weak frictional and/or electrostatic forces.

Referring again to FIG. 6, at step 605, holes may be formed in the laminated metal/carrier 712 using a hole forming process, such as a perforating process that uses an indexing mechanism to feed the laminate through the perforating head. In one example, the perforating head has two rows of pins that punch holes in the laminate as it moves through the tool. In one example, the metal foil being perforated is not under tension and is slack as it is fed through the perforating head. The carrier film is designed and configured to provide enough stiffness to the metal foil so that it can be fed through the perforating tool. The laminate may be orientated so that the punch pin enters on the metal foil side of the laminate and perforates both the metal and the carrier film. The carrier film also improves the quality of the holes formed in the metal foil, resulting in substantially defect-free holes, whereas holes formed in thin metal foil without the carrier may be more likely to include edge defects such as burrs, splinters, chads, and tears. In one example, an un-punched solid band is left on the top and bottom edges of the roll for electrical tabs and ease of handling during downstream processes for preparing a final anode structure. The punched holes may have any of a variety of diameters, center-to-center distances, and patterns. For example, a diameter in the range of 0.1 mm to 3.0 mm and in some examples 0.3 mm to 1.2 mm, a center-to-center distance of 0.15 mm to 3.5 mm and in some examples 0.4 mm to 1.4 mm, and a hexagonally arranged hole pattern.

Figure 8:
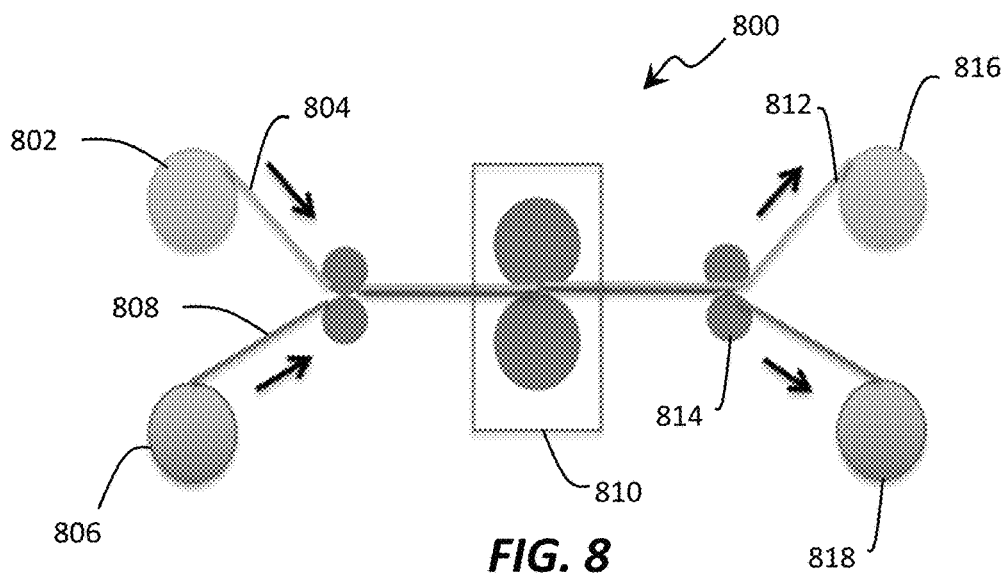
FIG. 8 illustrates an example rotary kiss cut roll-to-roll system.

In another example, at step 605, holes may be formed in the metal foil with a rotary kiss cut method. FIG. 8 illustrates one example of a rotary kiss cut roll-to-roll system 800 that includes a roll 802 of metal foil 804 and a roll 806 of carrier film 808 that may be fed through a rotary kiss-cut roller set 810. The rotary kiss-cut roller set 810 is configured and dimensioned to form holes only in the metal foil 804 and not the carrier film 808, with the resulting metal foil fragments (also referred to as chads) from the metal foil remaining attached to the low-tack adhesive side of the carrier film 808 when the now-perforated metal foil 812 and carrier film 808 are delaminated or peeled apart at roller set 814, with the metal chads remaining fixed to carrier film 808, and perforated metal foil 812 collected on roller 816 and carrier with chads collected on roller 818. In one example, a thickness of metal foil 804 is less than 100 um, and in some examples, between 4 um and 20 um, and in some examples, approximately 8 um. The rotary kiss-cut roller set is configured to punch the metal foil 804 while decreasing the chances the foil will tear or a crown will be left on one side of a punched hole. In addition, the low tack on the carrier film 808 ensures the chads are removed along with the carrier film thereby preventing the chads from remaining on the perforated metal foil 812 and contaminating the later-formed anode.

Figure 9:
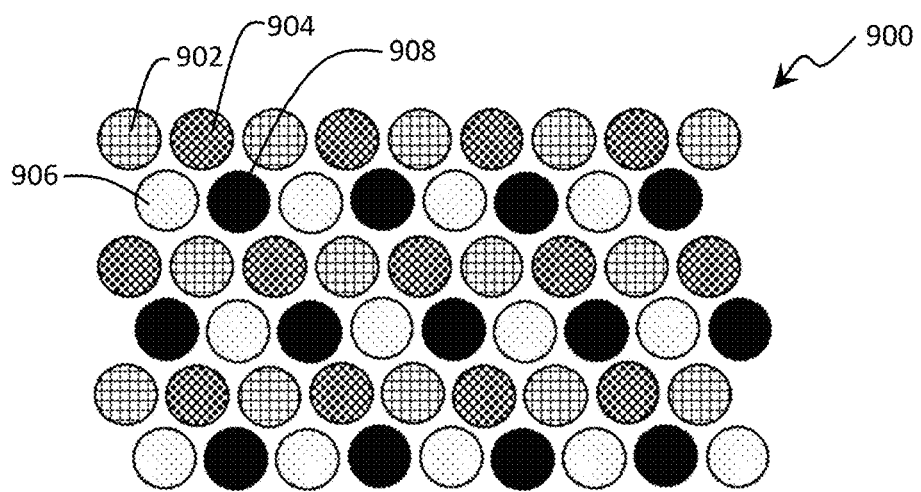
FIG. 9 illustrates an arrangement of openings in a porous current collector resulting from a multi-pass hole-forming process.

As discussed more below, in some examples, it may be desirable to increase an area of holes in a porous current collector relative to the total area of the current collector, also referred to herein as a percent open area. In a hole punching or rotary kiss-cut machine, however, there is a limit to how closely spaced the blades or pins can be. FIG. 9 illustrates one example approach for increasing a percent open area in a porous current collector with holes formed in an automated hole punching or rotary kiss cut process despite minimum space requirements between adjacent pins or blades. FIG. 9 illustrates an arrangement of openings 900 in a porous current collector resulting from a multi-pass process, where a metal foil-carrier film laminate can be passed through a series of hole punching or rotary kiss-cut roller sets where each subsequent roller set is offset from adjacent roller sets. FIG. 9 shows an arrangement of openings 900 formed by a plurality of offset hole punch roller sets, with cross-hatching indicating the roller set. In the illustrated example, four offset and in-series roller sets having a standard and commercially available pin spacing are used to create four sets of openings 900 labeled 902, 904, 906, and 908 (only one opening from each set labeled). By way of non-limiting example, a minimum spacing between pins or blades of a standard rotary die may be 0.8 mm, which would result in a maximum of ~40% open area in a porous metal foil. By controlling the registration of the metal foil, subsequent passes on the same foil through offset punch roller sets having 0.8 mm spacing can result in greater than 60% open area with 0.2 mm spacing between holes.

Referring again to FIG. 6, at step 607, the carrier film can be delaminated from the metal foil by peeling off the metal foil from the carrier film. To prevent the metal foil from curling, substantially all of the peeling stress can be applied to the carrier film. This may be done by keeping the now-perforated metal foil tensioned flat while bending the carrier approximately 180° backwards in a sharp curl, which may be automated in a roll-to-roll converting machine. And at step 609 the perforated metal foil can be used to build anodes for battery application by laminating an alkali metal foil to one or both sides, covering the holes. Lamination may be done by a roll-mill process. During lamination, the roll mill or other lamination process may be designed and configured to apply a sufficient pressure to extrude the alkali metal foil through the openings in the porous metal foil such that the alkali metal nearly or completely fills the holes of the perforated foil (for example, as shown in FIGS. 4 and 5) to ensure good electrical contact between them. Discrete anode pieces can then be punched out from the laminated ribbon and inspected for any edge defects. The anodes can then be assembled together with cathodes, separator, and electrolyte to make batteries.

Figure 10:
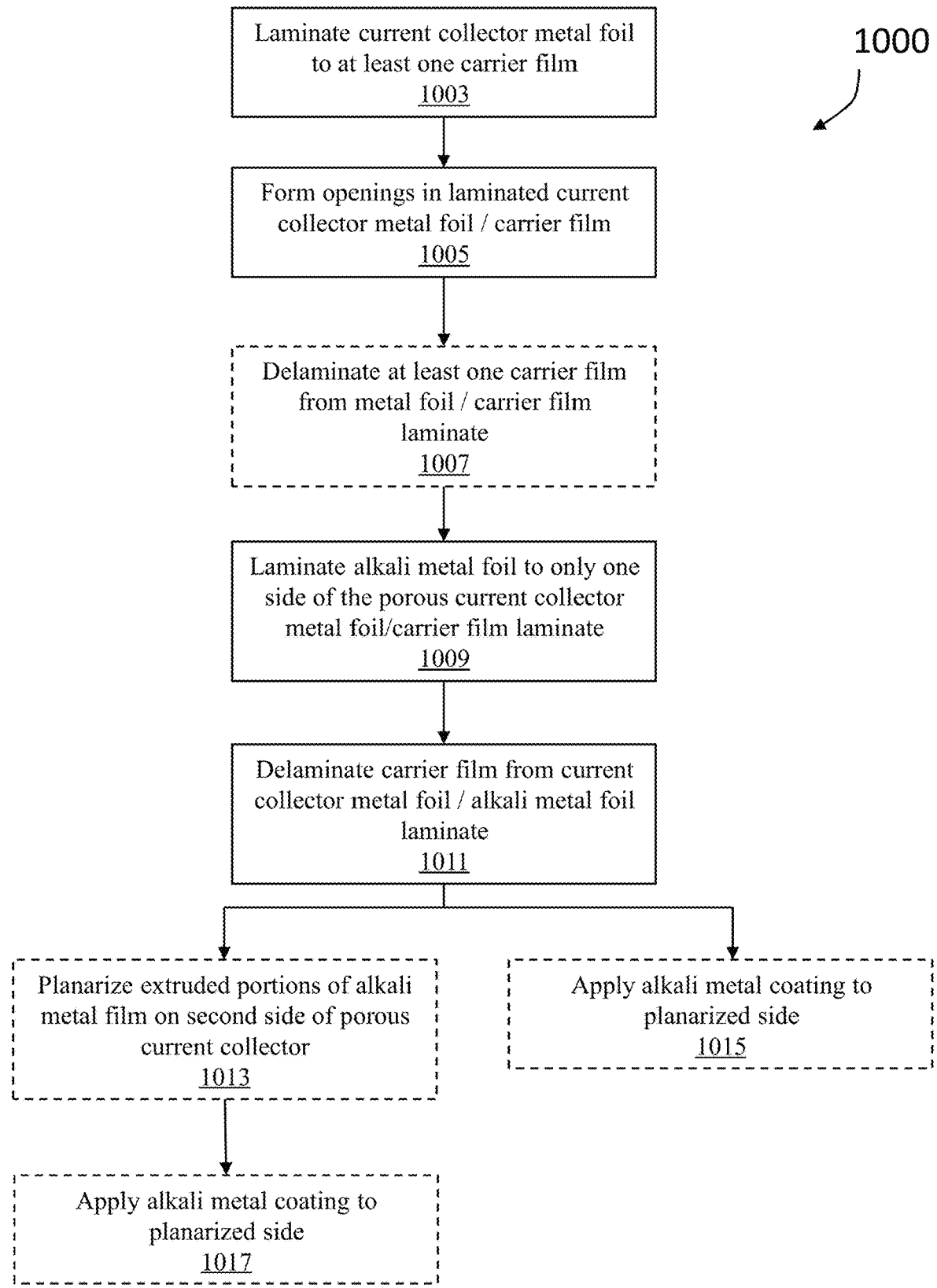
FIG. 10 is a flow-chart illustrating the steps of an example method for forming a porous current collector alkali metal foil laminate for use as an anode in a secondary metal battery.
Figure 11:
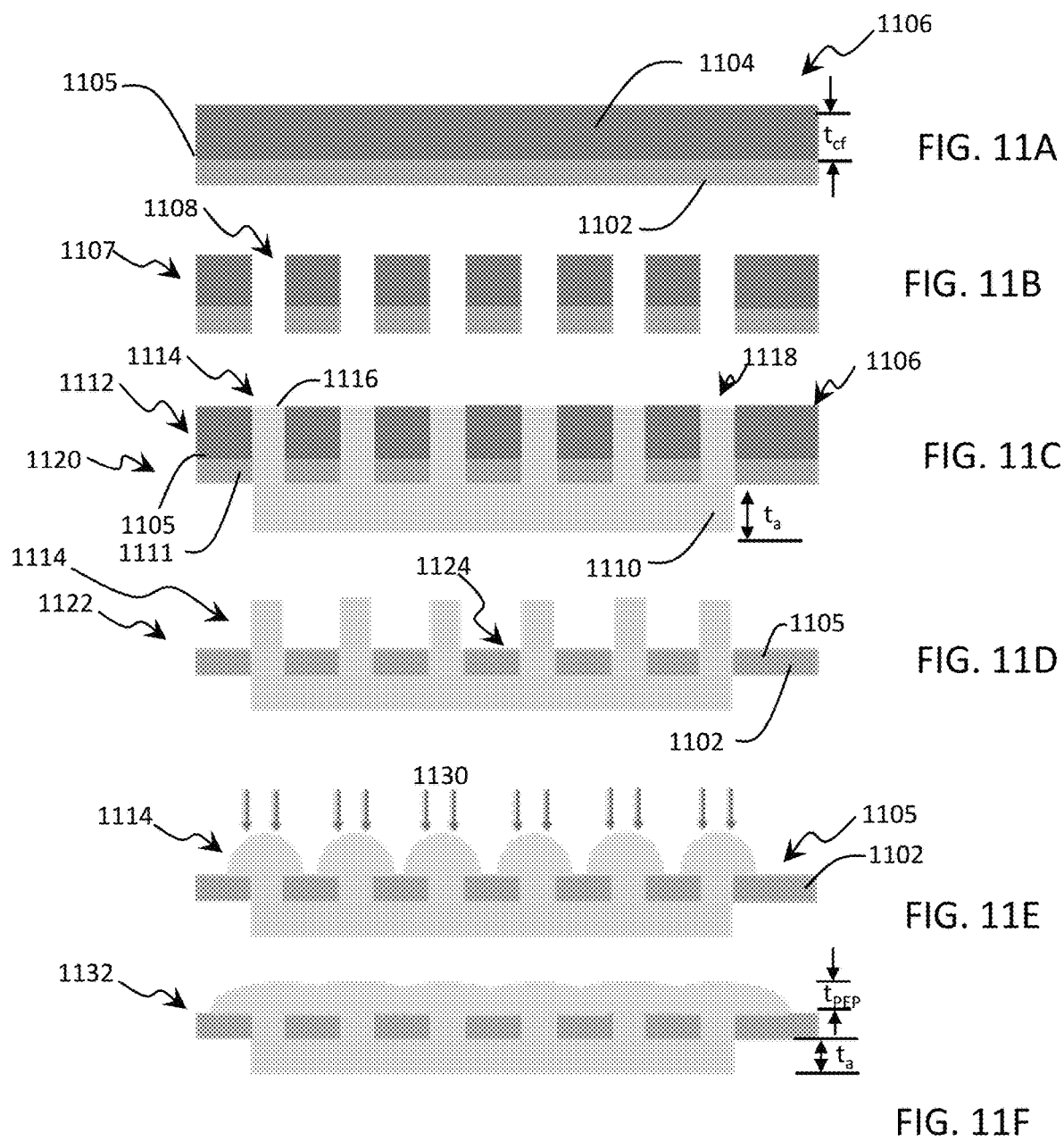
FIGS. 11A-11F illustrates cross-sectional side views of example structures that may be formed during performance of the method illustrated in FIG. 10.
Figure 12:
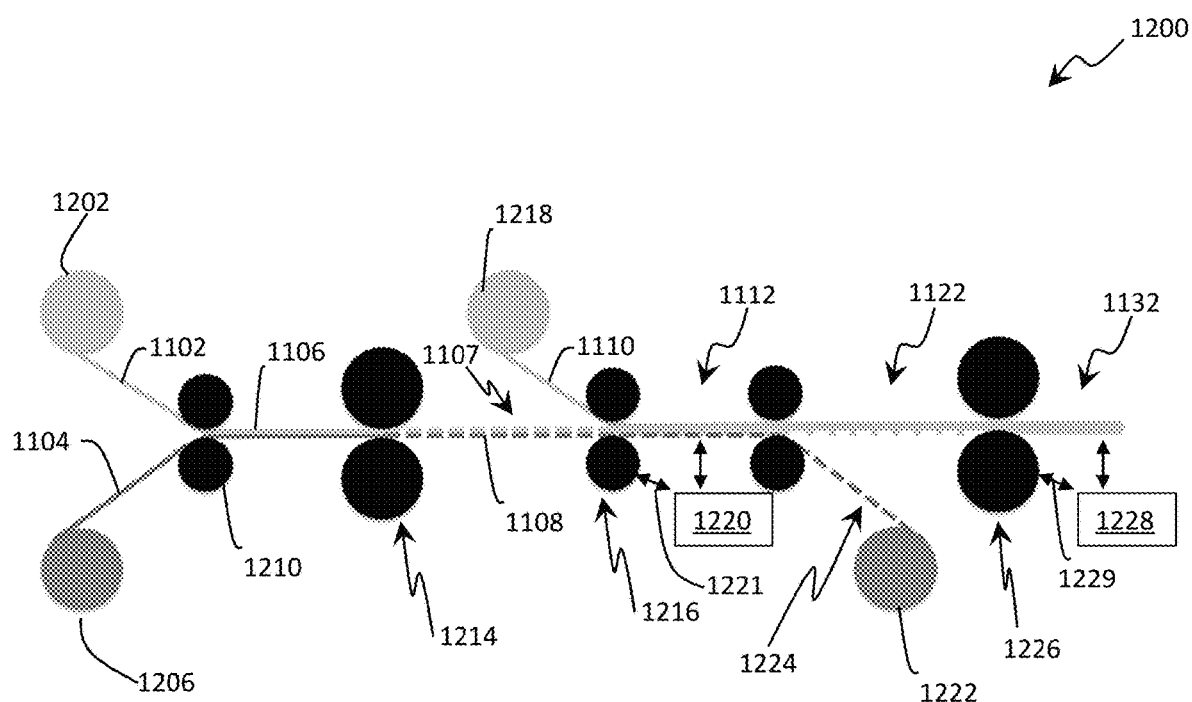
FIG. 12 illustrates an example roll-to-roll system that may be used to automate the method illustrated in FIG. 10.

FIG. 10 illustrates another example method 1000 of forming a porous current collector alkali metal foil laminate for use as an anode in a secondary metal battery, FIG. 11A-11F provide cross-sectional side views of example structures that may be formed during method 1000, and FIG. 12 illustrates an example roll-to-roll system that may be used to automate method 1000. Referring first to FIG. 10, at step 1003, a current collector metal foil may be laminated to at least one carrier film and at step 1005, holes may be formed in the current collector—carrier film laminate. FIG. 11A illustrates an example current collector metal foil 1102, such as copper, and carrier film 1104, such as PET, laminated together at a first side 1105 of the current collector foil 1102 to form a multi-layer substrate in the form of a carrier film-current collector foil laminate 1106. FIG. 11B illustrates one example where, at step 1005 (FIG. 10), openings 1108 (only one labeled) are formed in both the current collector foil 1102 and carrier film 1104, extending across the entire thickness of laminate 1106, forming a porous carrier film-current collector foil laminate 1107.

Returning to FIG. 10, the example shown in FIGS. 11 and 12 does not include optional step 1007, which is discussed below. At step 1009 and referring also to FIG. 11C, an alkali metal foil 1110 is laminated to only one side of the porous current collector-carrier film laminate 1107, here second side 1111 of the current collector, forming an alkali metal foil-current collector foil-carrier film laminate 1112. The lamination process at step 1009 is sufficient to cause the alkali metal foil 1110 to flow or extrude through openings 1108 forming extruded portions 1114 (only one labeled). In the illustrated example, the lamination process at step 1009 is sufficient to cause ends 1116 of the extruded portions 1114 to extend beyond first side 1105 of current collector foil 1102, and in the illustrated example, ends 1116 are substantially flush with a second side 1118 of carrier film 1104, the carrier film having a first side 1120 opposite the second side 1118 that is in contact with first side 1105 of the current collector foil 1102.

Carrier film 1104 can have any of a variety of thicknesses, tCF (FIG. 11A). In some examples, thickness tCF of carrier film 1104 is selectively configured according to a desired extrusion depth of extruded portions 1114 of alkali metal foil 1110. For example, for a given thickness tMF of alkali metal foil, thickness tCF may be greater than or equal to tMF/2 so that a depth of alkali metal foil extrusion through carrier film 1104 can be approximately equal to a remaining thickness, to (FIG. 11C) of the alkali metal foil on a second side 1111 of current collector foil 1102. In some examples, tCF may be selected to obtain a target total volume of extruded portions 1114 that result in a thickness of planarized extruded portions tPEP (FIG. 11F) being approximately equal to a remaining thickness, ta, of alkali metal foil on an opposite side of porous current collector 1102. In some examples, tCF may be selectively configured to obtain a target volume of extruded portions 1114 that is approximately the same as a remaining volume of the alkali metal foil on second side 1111 of current collector 1102.

Referring to FIGS. 10 and 11D, at step 1011, method 1000 may include delaminating carrier film 1104 from current collector foil 1102, resulting in an alkali metal foil-current collector metal foil laminate 1122 that includes extruded portions 1114 of the alkali metal foil that extend from and stand proud of first side 1105 of current collector foil 1102. Referring to FIGS. 10, 11E, and 11F at optional step 1013, in some examples, extruded portions 1114 of alkali metal may be planarized across first side 1105 of current collector foil 1102 by applying a force 1130 (FIG. 11E) to the extruded portions, resulting in alkali metal-current collector structure 1132 (FIG. 11F) that includes alkali metal distributed across both the first and second sides 1111, 1105 of the porous current collector foil 1102 for use as an anode in a secondary metal battery. In other examples, step 1013 may be omitted. For example, extruded portions 1114 may be left in the protruding form shown in FIG. 11D. In such examples, a depth of extrusion may be less than a depth of extrusion when the planarizing step 1013 is performed. If step 1013 is omitted, an alternate step 1015 of applying alkali metal to first side 1105 may be performed to ensure a relatively uniform layer of alkali metal across the entire surface of first side 1105, including the spaces 1124 (FIG. 11D, only one labeled) between extruded portions 1114. Any of a variety of processes may be used to apply alkali metal to side 1105, such as any of the processes described below in connection with FIGS. 25-27, such as vapor deposition (FIG. 25), electrodeposition (FIG. 26), slot-die coating, dip coating, micro gravure, or flexography (FIG. 27). Such additional process for applying a layer of alkali metal to first side 1105 of current collector 1102 may be performed after step 1011, or may be performed earlier, for example, before or after step 1003. In some examples, a thickness tCF of carrier film 1104 and resulting depth of extruded portions 1114 may be selected to be substantially the same as a thickness of alkali metal coating applied at step 1015.

In yet other examples, a coating of alkali metal is not applied to spaces 1124 during the construction of the anode and instead step 1015 is performed during initial charging of the battery cell by providing an initial amount of alkali metal ions in cathodes 104 (FIG. 1) and plating the metal ions onto the spaces 1124 containing the bare current collector during the initial charging of the battery.

Referring again to FIG. 10, a step 1017 that is substantially the same as step 1015 may be performed after step 1013 to apply a layer of alkali metal by, for example, vapor deposition, electrodeposition, slot-die coating, or plating during an initial charging, before or after planarization of the extruded portions 1114. For example, after planarization at step 1013, the resulting alkali metal-current collector structure 1132 (FIG. 11F) may still include portions of bare current collector 1102 along first side 1105 that does not have a layer of alkali metal. An additional layer of alkali metal may be applied to provide a uniform coating of alkali metal along first side 1105.

Thus, by laminating alkali metal foil 1110 to current collector foil 1102 while carrier foil 1104 is still laminated to the current collector metal foil, extruded portions 1114 of the alkali metal foil can extend beyond first side 1105 of the current collector foil 1102, providing a volume of alkali metal on first side 1105 of the current collector that can be planarized across the first side of the current collector, resulting in a more equal distribution of alkali metal on both the first and second sides 1105, 1111, of the current collector.

FIG. 12 illustrates one example of a roll-to-roll system 1200 that may be used to automate method 1000 and create the structures shown in FIGS. 11A-11F. Example roll-to-roll system 1200 includes a roll 1202 of current collector foil 1102 and a roll 1206 of carrier film 1104, that may include any of the low-tack adhesives described herein for adhering to metal foil 1102, the foil 1102 and film 1104 may be fed through a laminating roller set 1210 to laminate the two materials together, and the laminating roller set 1210 may be heated to ensure good adhesion between the current collector metal foil 1102 and carrier film 1104. The current collector metal foil/carrier film laminate 1106 (see also FIG. 11A) can then be passed through a hole punching machine 1214 configured to form openings 1108 (see also FIG. 11B) in the laminate 1106.

The now-porous current collector metal foil/carrier film laminate 1107 may then be passed through a laminating roller set 1216 along with an alkali metal foil 1110 from a roll 1218 of alkali metal foil, to form alkali metal foil-current collector foil-carrier film laminate 1112 (see also FIG. 11C). Laminating roller set 1216 may be heated and may be designed, configured, and controlled to apply a sufficient pressure to achieve a desired volume and/or extrusion depth of extruded portions 1114 of alkali metal (FIG. 11C), for example, a target height of extruded portions relative to first side 1105 of current collector foil 1102. In one example, system 1200 may include an extrusion monitoring system 1220 for monitoring an extent of extruded portions 1114 and provide feedback to laminating roller set 1216 for controlling a temperature and/or applied pressure of the laminating roller set to control an extent of extrusion. Extrusion monitoring system 1220 may be configured to generate an extrusion feedback signal 1221 according to the determined extent of extrusion and configured to send the extrusion feedback signal to laminating roller set 1216 to control an extent of the extrusion. Extrusion monitoring system 1220 may include any of a variety of sensing mechanisms known in the art for monitoring an extent of extrusion, such as a machine vision system configured to capture images of alkali metal foil-current collector foil-carrier film laminate 1112 which may be configured to capture and process images with a machine vision algorithm to determine if ends 1116 of extruded portions are below, above, or substantially flush with second side 1118 of carrier 1104 (FIG. 11C). In some examples, extrusion monitoring system 1220 may include one or more contact or non-contact sensors in addition to or instead of machine vision, for determining an extent of extrusion.

System 1200 also includes a porous carrier film roll 1222 for delaminating porous carrier film 1224 from alkali metal foil-current collector metal foil laminate 1122 and collecting the porous carrier film 1224 for recycling or disposal. System 1200 also includes a planarizing roller set 1226 that is designed and configured to apply heat and/or pressure to planarize extruded portions 1114 across first side 1105 of current collector foil 1102. In one example, system 1200 may include a planarizing monitoring system 1228 for monitoring an extent of planarization of extruded portions 1114 and provide feedback to planarizing roller set 1226 for controlling a temperature or applied pressure of the planarizing roller set to control planarization. Planarization monitoring system 1228 may be configured to generate a planarization feedback signal 1229 according to the determined extent of planarization and configured to send the planarization feedback signal to planarizing roller set 1226 to control an extent of planarization. Planarizing monitoring system 1228 may include any of a variety of sensing mechanisms known in the art for monitoring planarization, such as a machine vision system configured to capture images of alkali metal foil-current collector foil laminate 1132 which may be configured to capture and process images with a machine vision algorithm to determine if extruded portions 1114 have been sufficiently planarized to cover all or substantially all of first side 1105 of current collector foil 1102. In some examples, planarizing monitoring system 1228 may include one or more contact or non-contact sensors in addition to or instead of machine vision, for determining an extent of planarization. In some examples, system 1200 may include a multi-stage flat-press (not illustrated) which may be used instead of or in addition to laminating roller set 1216 and/or planarizing roller set 1226.

Figure 13:
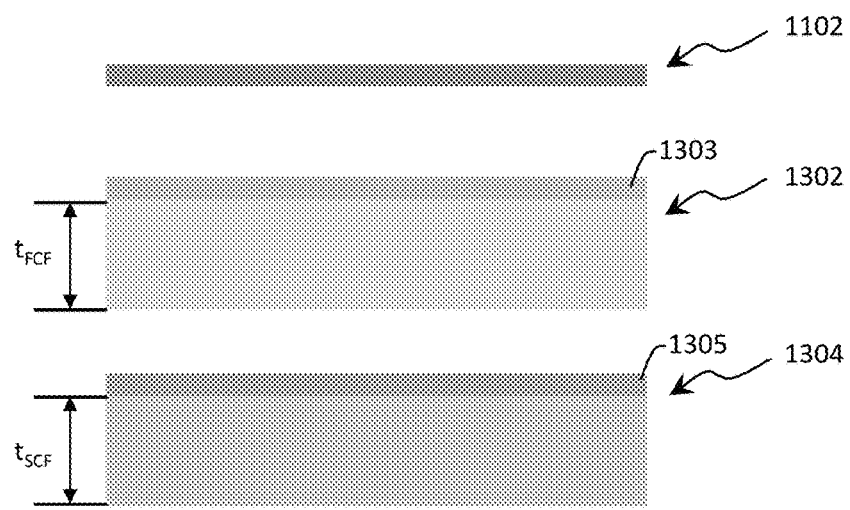
FIG. 13 is an exploded side view of a first and second carrier film and current collector metal foil.

Referring again to FIG. 10 as well as FIG. 13, in some examples, at step 1003 a plurality of carrier films are laminated to the current collector foil 1102. In the example shown in FIG. 13, the plurality of carrier films include a first carrier film 1302 with a low-tack adhesive layer 1303 and a second carrier film 1304 with a low tack adhesive layer 1305, which, as described below, allows for a perforation of current collector foil 1102 and removal of resulting metal chads by delaminating only the second carrier film 1304 from the metal foil 1102 and first carrier film 1302 prior to lamination of an alkali metal foil to the current collector. First and second carrier films 1302, 1304 can have any of a variety of thicknesses. In some examples, they have the same thickness. In other examples, first carrier film 1302 can have a thickness selectively configured according to a desired extrusion depth of alkali metal foil. For example, for a given thickness tMF of alkali metal foil, first carrier film 1302 may have a thickness, tFCF that is greater than or equal to tMF/2 so that a depth of alkali metal foil extrusion through the first carrier film can be approximately equal to a remaining thickness of the alkali metal film on an opposite side of the current collector metal foil. In some examples, tFCF may be selected to obtain a target volume of extruded portions 1114 (FIG. 11C) that result in a thickness of planarized extruded portions tPEP (FIG. 11F) being approximately equal to a remaining thickness, ta, of alkali metal foil on an opposite side of porous current collector 1102. A thickness, tSCF, of the second carrier film 1304 (FIG. 13) may be different than thickness, tFCF, of first carrier film 1302, and may be greater than or equal to a minimum thickness for removing chads 1424 (FIG. 14) of current collector foil 1102 and first carrier film 1302 during delamination of the second carrier film as described below. In some examples, thickness, tFCF, of first carrier film 1302 may be between 1 um and 300 um, and in some examples, between 25 um and 250 um, and in some examples, greater than 4 um. In some examples, thickness, tSCF, of second carrier film 1304 may be between 1 um and 500 um, and in some examples, between 25 um and 250 um, and in some examples, greater than 4 um.

Figure 14:
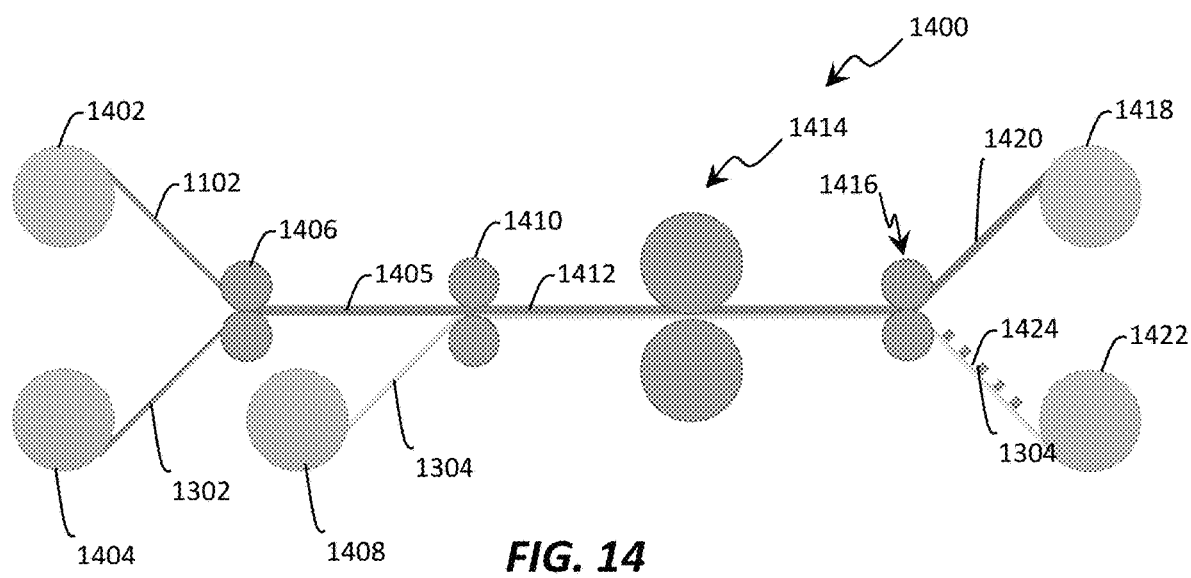
FIG. 14 illustrates an example roll-to-roll system for forming a porous current collector foil and first carrier film 1302 laminate.

Referring again to FIG. 10, at steps 1005 and 1007, method 1000 may include forming holes in the current collector metal foil/multi-carrier film laminate (step 1005) and then delaminating one of the carrier films to remove waste material. FIG. 14 illustrates an example roll-to-roll system 1400 for automatedly carrying out steps 1003 to 1007. As shown in FIG. 14, system 1400 includes a current collector metal foil roll 1402 for providing current collector foil 1102 and a first carrier film roll 1404 for providing first carrier film 1302, which may be formed from any of the materials described herein and have a low tack surface 1303 as any of the carrier films described herein. System 1400 includes a laminating roller set 1406 for performing a first portion of step 1003 and laminating current collector foil 1102 and a first carrier film 1302 to form a multi-layer substrate in the form of a current collector metal foil-first carrier film laminate 1405. System 1400 also includes a second carrier film roll 1408 for providing second carrier film 1304, and a laminating roller set 1410 for performing a second portion of step 1003 and laminating the second carrier film 1304 to the current collector metal foil-first carrier film laminate 1405 to form a multi-layer substrate in the form of a current collector metal foil-first carrier film-second carrier film laminate 1412. System 1400 also includes a hole-forming roller set 1414 for performing step 1005—forming holes in laminate 1412. In the illustrated example, hole-forming roller set 1414 is a rotary kiss-cut roller set having cutting elements designed and configured to form holes that extend only through current collector foil 1102 and first carrier film 1302 and not extend through second carrier film 1304, such that the resulting chads 1424 of the current collector metal foil and first carrier film are pressed against and adhered to the second carrier film for removal. System 1400 also includes a roller set 1416, a roller 1418 for collecting porous current collector foil and first carrier film 1302 laminate 1420 for use for downstream steps, e.g., steps 1009-1017 (FIG. 10), and a roller 1422 for collecting second carrier film 1304 and chads 1424 of current collector metal foil 1402 and first carrier film 1302 formed by hole-forming roller set 1414. Roller set 1416 and rollers 1418 and 1422 cooperate to perform step 1007—delaminating at least one carrier film, e.g., second carrier film 1304, from current collector metal foil/first carrier film laminate 1420. Thus system 1400 can be used instead of components 1202, 1206, 1210 and 1214 of system 1200 to prepare a porous current collector foil and first carrier film 1302 laminate 1420 that may be laminated to an alkali metal foil, for example, as described in connection with FIG. 12 and steps 1009-1017 of FIG. 10.

Porous Current Collector Design

The openings in a porous metal foil permits alkali metal accessibility on both sides of a anode structure despite having been laminated to only one side of the current collector metal foil. The hole pattern on the current collector metal foil can be optimized to allow for unhindered alkali metal access on both sides of the anode, while providing good electrical contact, thereby increasing cell cycle life. Example variables that can be tuned to create an optimal hole design include 1) shape of the holes, 2) size of the holes, 3) arrangement and spacing between the holes, and 4) thickness of the porous foil. Shape, size, and spacing between the holes also determine a percentage of open area, i.e., the area of the current collector foil that is made up by the holes.

In one example, tests by the present inventors indicate an optimal hole pattern includes round or polygon holes having a maximum width in the range of 0.1 mm to 3 mm and in some examples, 0.3 mm-1.5 mm, and in some examples, 1 mm-1.5 mm, and in some examples, greater than approximately 0.5 mm. The holes or openings may be placed in a close packed arrangement to give a percentage open area occupied by the openings in the range of 30%-99% and in some examples, 40%-80%, and in some examples, 60%-90%, and in some examples, above 50% and in some examples, greater than 80% based on a total area of 100% of the current collector, but not including any non-porous areas of the current collector, for example, non-porous tabs or bands above or below the porous area that may be used for electrical tabs or ease of handling. A minimum strand width (also referred to as web width) of the resulting web is below 0.25 mm and in some examples, below 0.15 mm. A thickness of the perforated foil may be between 4 to 20 um. An alkali metal may be applied to one or both sides of the porous current collector using any of the methods disclosed herein, resulting in a thickness of alkali metal on each side of the current collector in the range of 0 um-100 um, and in some examples, 0 um-50 um.

FIGS. 15A-15G illustrate example hole pattern designs including various hole shapes (Round, Hexagon) and sizes (0.3 mm, 0.75 mm, 1.2 mm). The holes are arranged compactly in a triangular pitch and the spacing between the holes is tailored to get a desired open area percentage (40%, 55%, 70%, 80%). Holes punched on metal foils are traditionally round (circular or oval) holes with no sharp corners for ease of tool maintenance. Round holes, however, may form a perforation pattern having uneven web widths (strand width) and limit how close the holes can be arranged. In comparison, polygon shaped holes (triangle, square, hexagon, etc.) offer a more compact arrangement with slimmer web widths in the perforated pattern.

Table 1 (below) lists test results from example designs along with the corresponding mass and thickness of anodes made by laminating 40 um thick lithium on one side of the perforated sample, wherein the lithium metal substantially filled the openings in the porous current collector, but extrusions were not present on opposite side. Table 1 also lists the cycle life performance of cells made with the anode of this disclosure along with that of the conventional Li/Cu/Li anode. As seen in Table 1, for the same total lithium thickness, anodes made with perforated copper foil are lighter and thinner than that of a corresponding conventional Li/Cu/Li anode. This reduction in mass and thickness of anode transfers to higher gravimetric and volumetric energy density of the cell. As copper can be denser than lithium, perforated foil with open area 70% and above reduces the mass of the anode by as much as 50% compared to a conventional Li/Cu/Li structure. Even if the perforated copper is 16 um thick, there may be a noticeable reduction in weight of more than 30%. Perforating the current collector also reduces the resulting anode thickness. As lithium is a soft metal, it extrudes under pressure during lamination and fills the holes on the perforated foil, resulting in thinner anode. For instance, laminating 40 um lithium one side on to an 8 um perforated foil with 70% open area results in an anode with a thickness of 43 um, as opposed to 48 um (Table 1).

metal utilization. By contrast, for anodes constructed with the various methods discussed in connection with FIG. 10, high cycling performance may be achievable with a porous

TABLE 1

| Copper thickness (micron) | Hole shape | Hole size diameter (mm) | Web width (mm) | Open hole area (%) | After lamination of 40 um lithium one side |  |  |
|---|---|---|---|---|---|---|---|
|  |  |  |  |  | Weight (g) | Thickness (um) | Cycle life |
| 8 | Round | 0.3 | 0.151 | 40 | 0.118 | 46 | 85 |
|  |  |  | 0.085 | 55 | 0.099 | 45 | 93 |
|  |  | 0.75 | 0.213 | 55 | 0.096 | 45 | 92 |
|  |  | 1.2 | 0.165 | 70 | 0.078 | 43 | 100 |
|  | Hexagon | 0.75 | 0.146 | 70 | 0.080 | 43 | 115 |
|  |  | 1.2 | 0.141 | 80 | 0.072 | 43 | 113 |
| 16 | Round | 0.3 | 0.085 | 55 | 0.158 | 50 | 103 |
|  |  | 0.75 | 0.213 | 55 | 0.147 | 50 | 102 |
|  |  | 1.2 | 0.165 | 70 | 0.122 | 47 | 113 |
|  | Hexagon | 0.75 | 0.146 | 70 | 0.125 | 47 | 118 |
|  |  | 1.2 | 0.141 | 80 | 0.098 | 46 | 123 |
|  | Traditional | Li/Cu/Li | 20/8/20 um |  | 0.160 | 48 | 125 |

Figure 16:
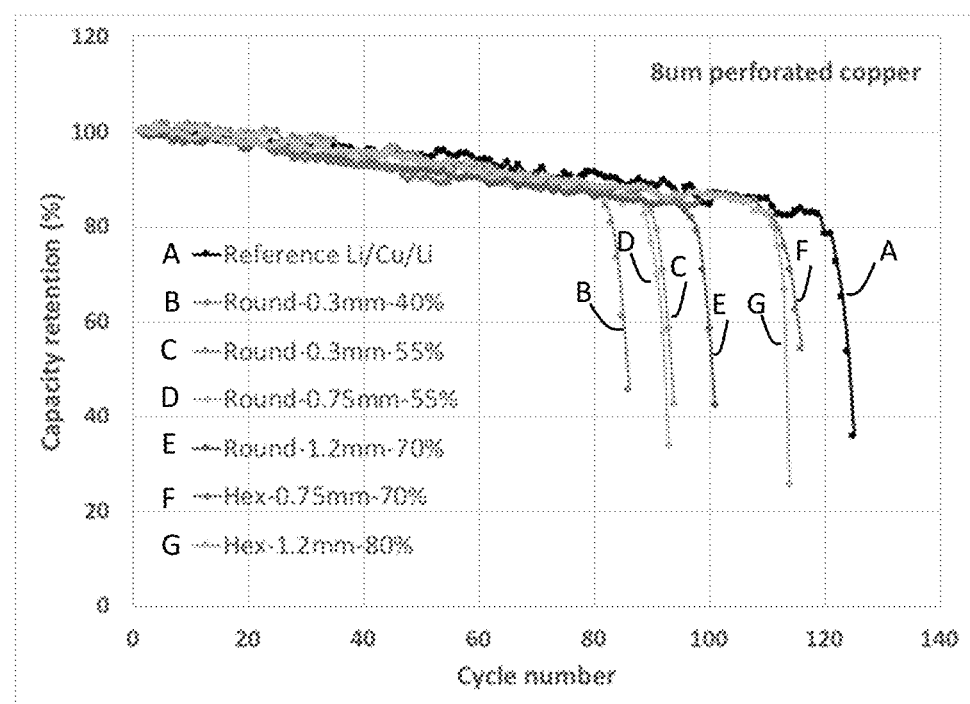
FIG. 16 shows the cycling performance of cells made with the various 8 um thick perforated copper foil designs having 40 um lithium foil laminated on one side.

FIG. 16 shows the cycling performance of cells made with the various 8 um thick perforated copper foil designs having 40 um lithium foil laminated on one side. The cycle performance of the cells tends to improve with increase in hole size and open area. For example, of the cells with perforation design having round holes, the 1.2 mm size with 70% open area shows the best cycle performance. In addition, cells with hexagon holes are found to show a comparatively better performance than round holes.

Figure 17:
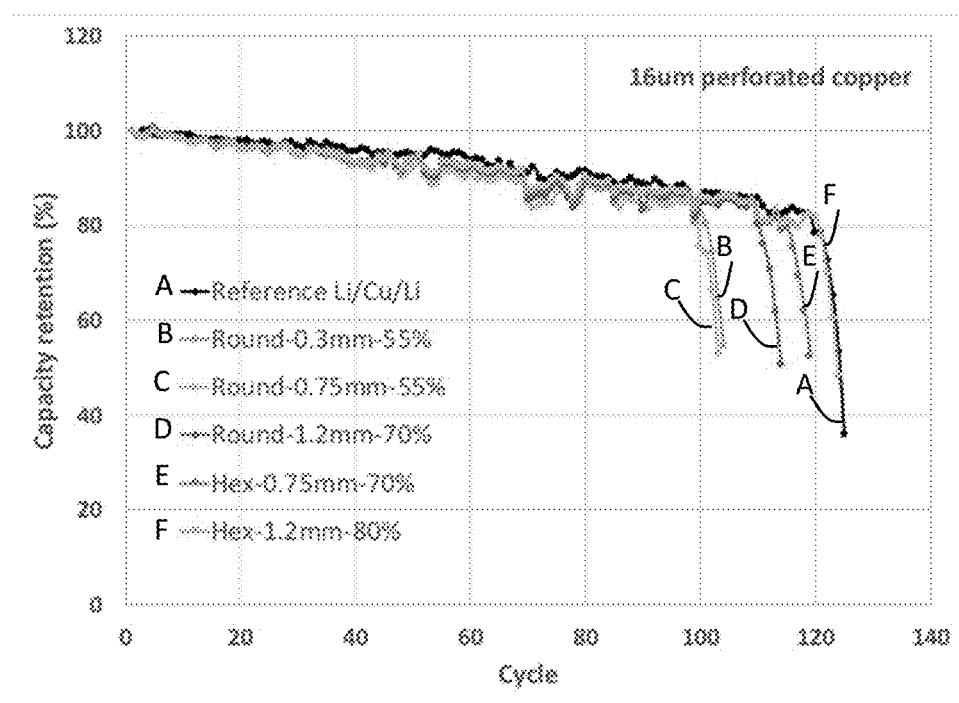
FIG. 17 shows the cycling performance of cells made with the various 16 um thick perforated copper foil designs having 40 um lithium foil laminated on one side.

FIG. 17 shows the cycling performance of cells made with the various 16 um thick perforated copper foil designs having 40 um lithium foil laminated on one side. The cycle performance of cells with 16 um perforated copper can be better than the 8 um samples with similar hole pattern. This could be due to a better electrical contact with the laminated lithium (the thicker 16 um perforated copper is embedded deeper inside the lithium foil), which increases the lithium utilization in the cell. Using copper foil with higher thickness (25 um or above) could negate any gravimetric and volumetric benefits of perforating, compared to conventional anode.

Similar to the 8 um samples, the 16 um samples also show cycling performance improvement with increase in hole size and open area. Cells with hexagon holes were also found to show relatively better performance than round holes. For instance, the cell design with 1.2 mm hexagon holes and 80% open area show cycling performance identical to that of the conventional Li/Cu/Li anode (FIG. 17).

The improvement in cell performance with hexagon holes could be due to a thinner and uniform web width in the perforation pattern, that reduces polarization and promotes uniformity of lithium consumption in the anode. A compact hole arrangement and an unwavering web width in the perforation design, could also be attained with other polygon shapes, such as square, triangle, pentagon, etc. Table 1 also lists the corresponding web widths for each hole pattern. Table 1 indicates the web width of the perforation designs below 0.25 mm or below 0.15 mm result in higher cycling performance.

As noted above, the test data shown in Table 1 and FIGS. 16 and 17 are from an anode with alkali metal that substantially filled the openings in the porous current collector, but extrusions of alkali metal were not present. In such a configuration, it may be more important to maximize the percent open area of the current collector to increase alkali current collector with a lower percent open area because the extruded portions of the alkali metal enable a greater distribution of the alkali metal on both sides of the current collector, resulting in improved electrical contact and increased alkali metal utilization. Thus, a method of designing a porous current collector may include a step of determining the amount of alkali metal that will be located on both sides of the current collector, and then determining a corresponding minimum % open area of the current collector to achieve a target cell performance metric, such as cell cycle life.

Referring again to FIGS. 4 and 5, the extent of lamination between perforated current collector 202 and alkali metal foil 204 is schematically shown. During lamination, the applied pressure and temperature influences the degree to which the alkali metal extrudes and fills or nearly fills openings 210 of the porous current collector 202. Testing by the present inventors indicate that, in some examples, a greater extent of alkali metal extrusion and filling of the openings 210 with the alkali metal improves cell cycling performance, which may be due to improving electrical contact between the alkali metal and current collector. Alkali metal foil 204 that extrudes inside openings 210 may have an end 402 having a convex surface, which can either be on level with the current collector surface or may protrude to some extent.

In some examples, a porous current collector may be made via a photo-lithography process by electroforming or photo-etching. Such processes may allow for production of perforated metal foil having high open area, together with thinner and uniform web widths as compared to a hole punching process. In general, a photo-lithography process enables production of perforated foil having open area as high as 90% or more. The high open area permits uniform alkali metal accessibility on both sides of the anode laminate built with alkali metal foil on one side. Photo-lithography processes allow for production of porous metal foil with almost any hole shape. For instance, any polygon-shaped hole (triangle, square, pentagon, hexagon, etc.) can be made. In comparison to round or oval hole pattern, the polygons can be arranged more compactly to achieve higher open area and uniform web width. Photo-lithography processes allow for production of perforated patterns with much more narrow web widths than round holes. For example, the minimum spacing between the holes may be below 0.2 mm, which is a typical minimum spacing required for conventional hole punching processes, and could be as low as, for example, 0.05 mm. Narrow web widths, in general, allow for perforation designs with higher open area and greater alkali metal accessibility.

Photo-lithography is a standard technique used in manufacturing parts for micro-electronics. In the photo-etching process a photo-resist is coated on a substrate and a subsequent image is exposed. The workpiece is developed to remove unexposed resist and the exposed resist is used to mask the regions on the surface of a thin foil that corresponds to the web pattern. The work piece is then exposed to a metal-selective etchant to etch away the metal not covered by the photoresist. In a subsequent step the remaining photoresist is then removed leaving the patterned workpiece. In the electroforming process, a mask is applied on a mandrel in regions corresponding to holes in a web, and the current collector foil is electro-deposited in the gaps, to make the web.

Figure 18A:
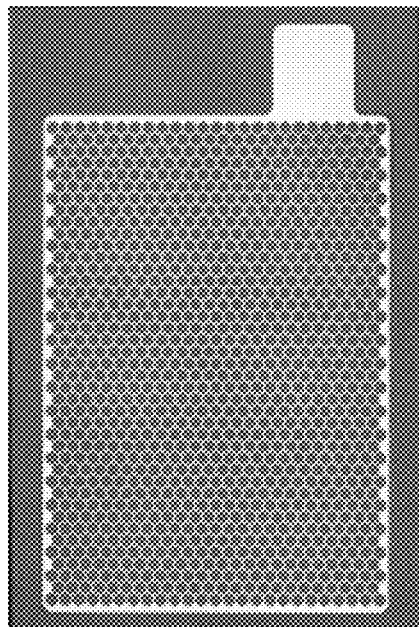
FIGS. 18A-18C show an example perforated copper current collector.
Figure 18B:
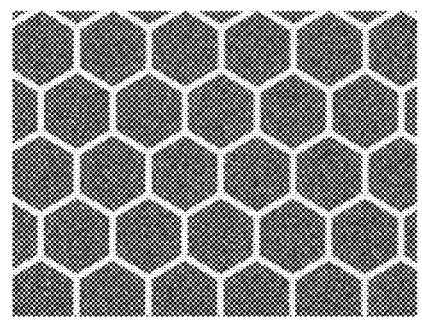
Figure 18C:
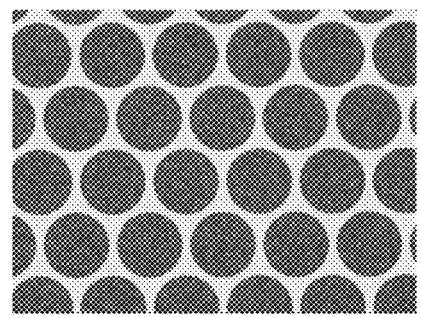

FIGS. 18A and 18B show a perforated copper current collector made by electroforming, with an open area of 80%, formed by a close arrangement of hexagon-shaped holes. In comparison, round holes of the same size and arrangement as shown in FIG. 18C results in a 72% open area. FIGS. 18B and 18C show the web patterns formed by the hexagon and the round holes. As evident from the images, the web width between the hexagons is much thinner and uniform than the round holes, allowing for high open area.

Figures 19A, 19B, 19C, 19D:
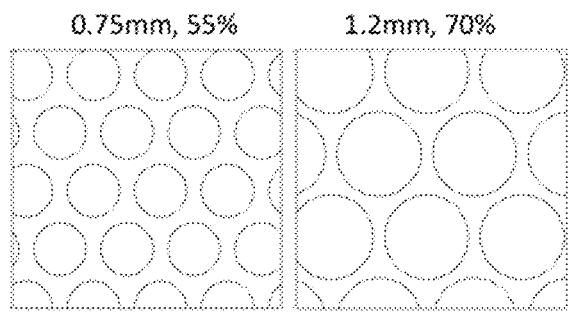
FIGS. 19A-19D show example web patterns formed by a photo-lithography process.
Figure 20:
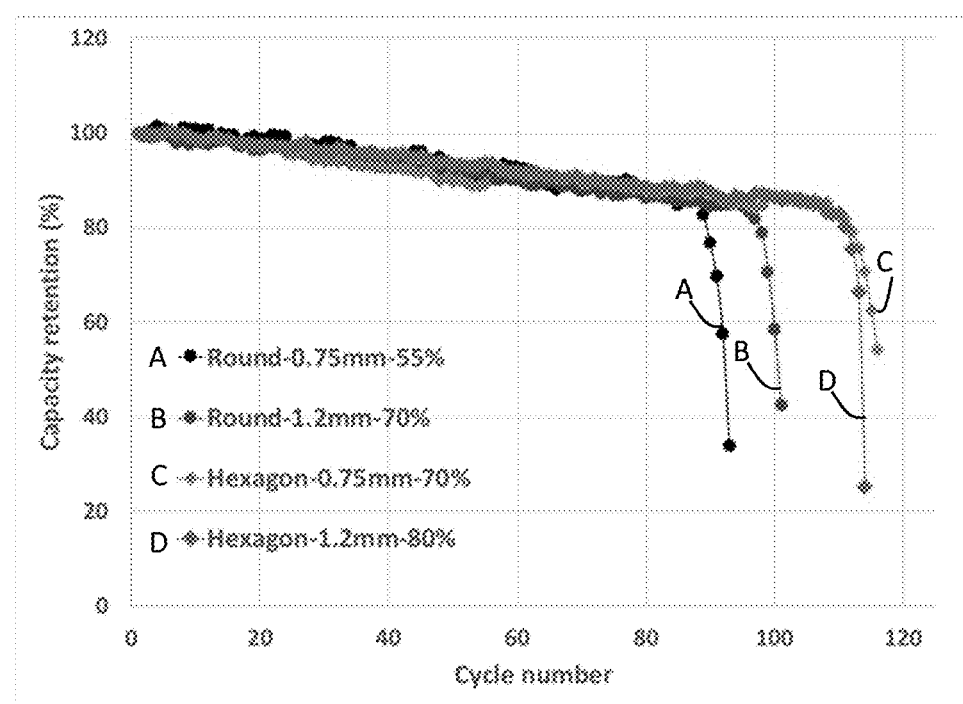
FIG. 20 shows the cycling performance of cells made with the various perforated copper foil designs having 40 um lithium foil laminated on one side.

FIGS. 19A-20 and Table 2 illustrate a subset of the test anodes described above in connection with FIG. 1 to highlight the impact of hole shape on web width and percent open area. FIGS. 19A-19D show example web patterns formed by a photo-lithography process, including round and hexagon-shaped holes of size 0.75 mm and 1.2 mm, and open area between 55% and 80%. Table 2 lists the web widths of hole patterns above and the corresponding cycle life attained in cells (FIG. 20) made with anodes having perforated copper current collector of that pattern. The cycling performance of cells is directly proportional to the percentage open area and inversely proportional to the web width of the perforation pattern. The anodes used for the test data shown in Table 2 and FIG. 20 were made using step 609 of process 600 (FIG. 6) wherein the lithium metal substantially filled the openings in the porous current collector, but extrusions were not present on opposite side. Table 2 lists the web widths of the hole patterns illustrated in FIGS. 19A-19D and the corresponding cycle life measured in tests of cells that incorporated the illustrated current collectors. FIG. 20 illustrates cycle life performance data listed in Table 2. Table 2 and FIG. 20 indicate the cycling performance of cells is directly proportional to the percentage open area and inversely proportional to the web width of the perforation pattern. As noted above in connection with Table 1 and FIGS. 16 and 17, cycling performance for the smaller % open area current collectors can be increased by using method 1000 (FIG. 10) for construction of the anode.

TABLE 2

| Hole shape | Hole size diameter (mm) | Web width (mm) | Open hole area (%) | Cycle life with 40 μm lithium on one side |
|---|---|---|---|---|
| Round | 0.75 | 0.213 | 55 | 92 |
|  | 1.2 | 0.165 | 70 | 100 |
| Hexagon | 0.75 | 0.146 | 70 | 115 |
|  | 1.2 | 0.141 | 80 | 113 |

Figure 21A:
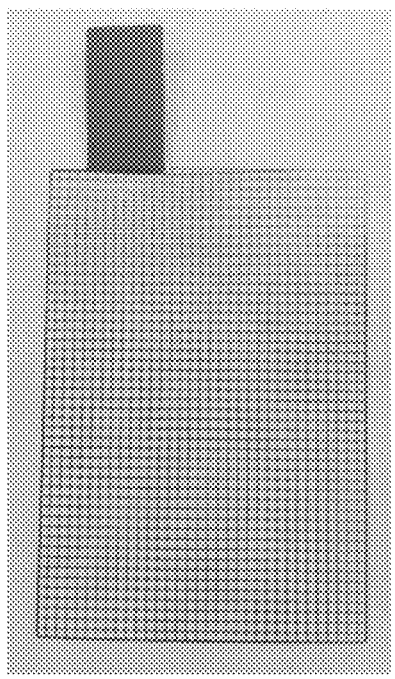
FIGS. 21A-21B show a porous titanium current collector made by photo-etching process.
Figure 21B:
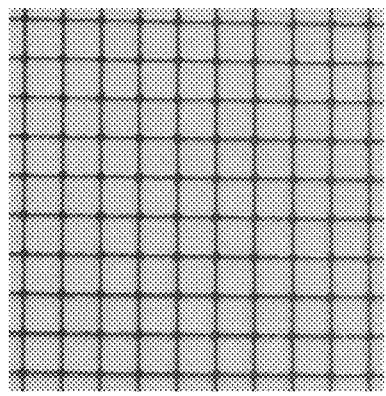

FIGS. 21A-21B shows a porous titanium current collector made by photo-etching process, with ~90% open area. The high open area attained is a result of the closely packed square holes with a web width of 0.05 mm, made possible by the photo-etching process.

Figures 22A, 22B, 22C:
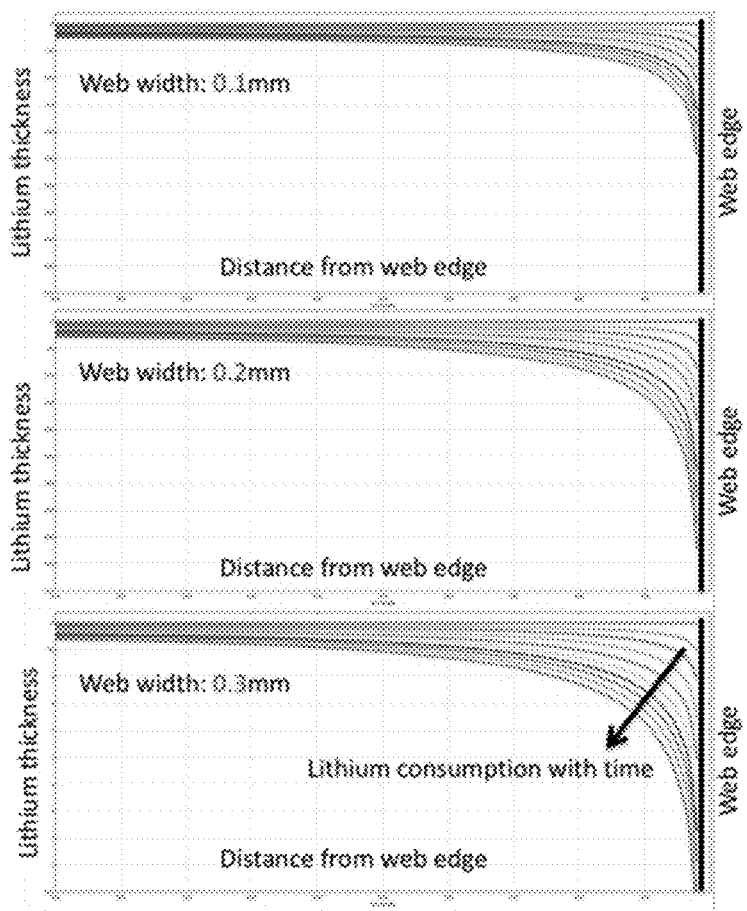
FIGS. 22A-C show computational simulations of lithium consumption near the web edge of a porous current collector in an anode for three different web widths.

FIGS. 22A-22C show computational simulations of lithium consumption near web edge in an anode for three different web widths of 0.1 mm (FIG. 22A), 0.2 mm (FIG. 22B), and 0.3 mm (FIG. 22C) simulating lithium consumption with time adjacent the web edge during cycling in cells built with anode having perforated current collector and laminated lithium on one side using method 600 (FIG. 6) wherein the lithium metal substantially filled the openings in the porous current collector, but extrusions were not present on the porous current collector side. On the side of the anode with porous current collector, the width of the web is shown to affect the uniformity of lithium consumption. In essence, the thinner the web width, the more uniform the lithium consumption, which leads to better lithium utilization and longer cycle life of the battery.

The present disclosure includes a variety of constructions and methods of manufacture that include the manufacture and use of a perforated metal foil as a current collector and the lamination of an alkali metal foil to only one side of the perforated foil to produce an anode. The openings in the current collector foil permit alkali metal accessibility on both sides of the anode structure. These methods enable the utilization of more commonly available alkali metal foils, such as lithium foils, for example, foils with a thickness greater than or equal to 30 um, for anode production, with substantially the same resulting anode thickness as compared to the conventional approach of applying a thinner alkali metal foil to both sides of a current collector. For non-limiting example, a 40 um thick lithium foil may be laminated to only one side of an 8 um perforated copper foil to make an anode, the resulting thickness of which is similar to or lower than a conventional Li/Cu/Li anode with 20/8/20 um thicknesses. Such methods also enable the production of battery cells with larger areal dimensions as it makes use of more commonly available and easily manufactured alkali metal foils of thickness 30 um or above that is also available in wider roll widths (for example, up to 200 mm). The anodes of this disclosure also increase the gravimetric and volumetric energy density of the cell, as the openings in the current collector reduce the mass and volume associated with the typically dense current collector foil.

By way of example, in a prior art secondary lithium battery manufacturing process, lithium foil (active material) is laminated to both sides of a copper foil (current collector) to form the conventional (Li/Cu/Li) anode. For example, a ~20 um thick lithium foil is laminated to both sides of an ~8 um copper foil. However, as lithium can be soft and sticky, it may be difficult by traditional roll-milling process to produce lithium foil with thickness ~25 um or below. By contrast, using one or more of the methods disclosed herein, a perforated foil can be used as the current collector and lithium can be laminated to only one side of the perforated foil. The perforations on the current collector allow for the lithium to be accessed on both sides of the anode structure. This disclosure enables use of the commonly available lithium foil of thickness 30 um or above, for anode fabrication. For example, a 40 um thick lithium foil laminated to one side of a perforated copper foil, could be used as the anode.

In one non-limiting example, a perforated copper foil is made via one of the methods disclosed herein. The width of the roll of perforated current collector foil may be above 60 mm or 70 mm. The percentage open area of the perforated foil may be above 40% or 60%. An un-punched solid band can be left on the top and bottom edges of the roll for electrical contact and ease of handling. The thickness of the perforated copper foil may be between 4 um to 20 um. The perforated copper is then laminated with a lithium foil on only one side, covering the holes, to make anodes for a battery application. The width of the lithium foil may be substantially the same or slightly wider than the perforated part of the copper foil. The thickness of the lithium foil may be between 30 um and 60 um. In one example, an 8 um thick perforated copper foil with a width of a perforated strip or area that is approximately 75 mm and 65% open area may be used. The perforated copper foil is laminated with a 77 mm wide, 40 um thick lithium foil on one side, covering the holes. Lamination may be done with any of the methods and systems disclosed herein, for example, using a roll-mill process, in which, the pressure of the roll-mill is set such that lithium extrudes and nearly or completely fills the holes of the perforated copper to ensure good electrical contact and high lithium accessibility on the copper side.

Discrete anode pieces can then be punched out from the laminated copper-lithium ribbon and inspected for any edge defects. The anodes are then assembled together with cathode, separator, and electrolyte to make lithium batteries. The perforated copper enables anodes with single-side lithium lamination, as the perforations allow the lithium to be accessed on both sides of the electrode. As copper can be much denser than lithium, the perforated copper also lowers the anode mass significantly and boost the specific energy of the battery.

Photo-lithography processes enable production of discrete current collector parts with customized size and hole patterns having high open area. By way of example, a ~90 mm wide perforated titanium current collector made by a photo-etching process, with ~90% open area may be constructed. In comparison to a 60 mm wide conventional lithium anode, anodes with perforated current collectors allow cell production with much larger areal dimensions. Pouch cells made with 90 mm wide anode are typically 3 to 4 times larger than cells made with conventional anodes. Thus, perforated current collectors with lithium laminated to one side allows for more flexible cell sizes, and higher packing and energy density at the pack level.

Perforated current collectors of this disclosure may be made with any metal suitable for an alkali metal cell, such as copper, titanium, nickel and other refractory metals and alloys that are stable against a given alkali metal, e.g. lithium. Perforated current collectors of the present disclosure may be made by any of a variety of processes, such as manual hole punching, rotary die-cutting, electroforming, photo-etching, laser cutting, etc. A perforated current collector may also be made by flattening a woven, non-woven, or an expanded metal mesh that may be formed in a metal mesh weaving or forming process. In some examples, a perforated current collector of this disclosure may have thickness ranging from 4 to 20 um or above. The perforated current collectors of this disclosure could also be used in cells that have alkali metals other than lithium as anode active material, such as, sodium, potassium, etc.

Figures 23A, 23B, 23C:
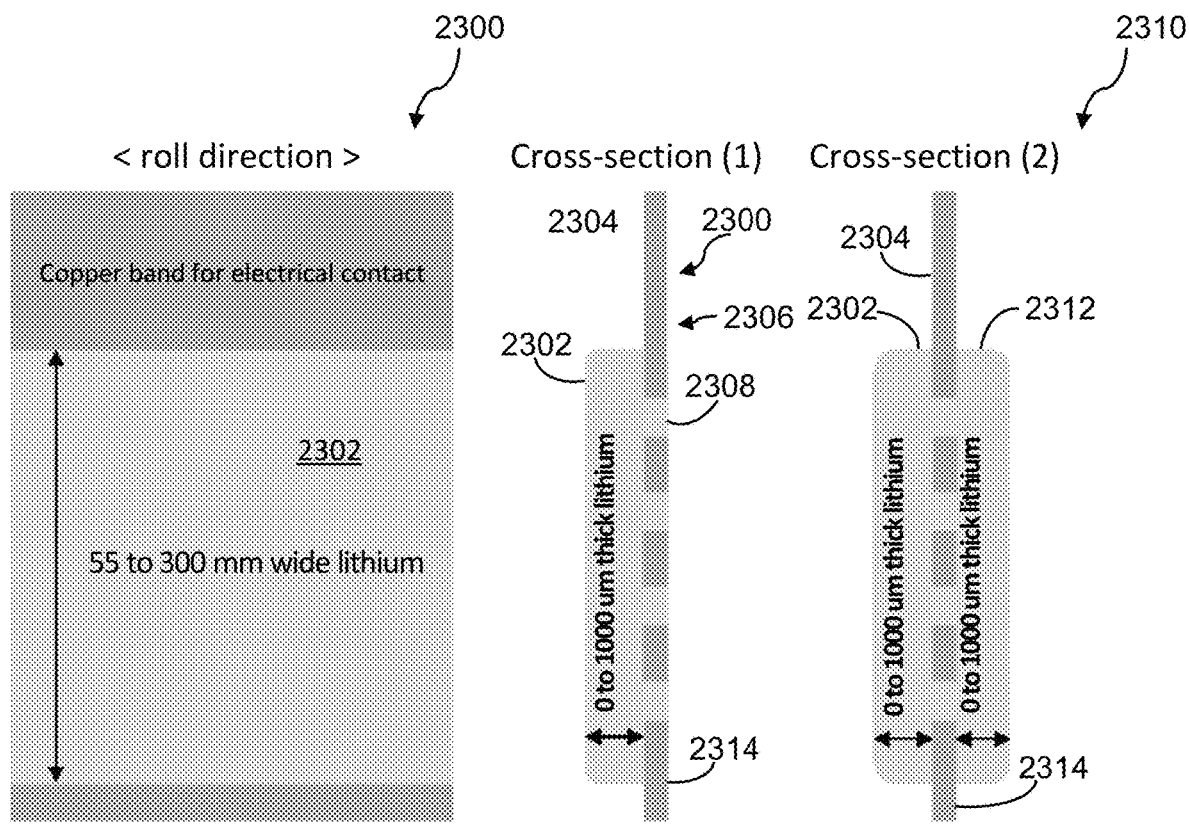
FIGS. 23A and 23B illustrate an example of a wide anode structure of the present disclosure with an alkali metal foil laminated to only one side of a porous current collector.
FIG. 23C illustrates an example of a wide anode structure of the present disclosure with alkali metal foils laminated to both sides of a porous current collector.

FIGS. 23A and 23B illustrate an example wide anode 2300 of the present disclosure that includes an alkali metal foil 2302 laminated to only one side 2304 of a porous current collector 2306 with a plurality of openings 2308 (only one labeled). By laminating alkali metal foil 2302 to only one side, a thicker alkali metal foil can be used, while still resulting in a lower total thickness for the anode. By utilizing a porous current collector 2306, openings 2308 allow for access to alkali metal 2302 from the second side 2314 of the current collector. FIG. 23C illustrates a cross section of a second example of a wide anode 2310 that is the same as anode 2300 except anode 2310 includes a second alkali metal foil 2312 laminated to a second side 2314 of current collector 2306. In other examples, anode 2300 or 2310 may have a solid non-porous current collector that does not include openings 2308. As shown in FIGS. 23B and 23C, alkali metal foils 2302 and 2312 may have a thickness from 0 um to 1000 um and a width from 55 mm to 300 mm or greater. Such anode structures allow for the production of secondary alkali metal batteries with large cell dimensions which may be used to meet the energy demands of various applications, including consumer electronic, commercial/recreational drone, and electric vehicle applications.

FIGS. 24A and 24B illustrate an example wide-format anode 2400 with lithium width between 55 to 300 mm or greater formed by parallel lamination of multiple lithium ribbons 2402, 2404, each with width below, for example, 55 mm. For example, to make an 80 mm wide lithium anode 2400, two lithium ribbons 2402, 2404 of width 50 mm and 30 mm, respectively, can be laminated side-by-side to a first side 2406 of a porous current collector foil 2408 in a closely-spaced parallel arrangement across the porous current collector foil to form a wide-format anode. A gap 2410 between the laminated lithium ribbons 2402, 2404 may be small, for example, less than 0.5 mm to maximize uniform alkali metal availability to an adjacent cathode. FIG. 24C shows an example anode 2420 that is the same as anode 2400 except that two lithium ribbons 2422 and 2424 are also laminated to second side 2426 of current collector 2408. In other examples, anode 2400 or 2420 may be formed with a solid non-porous current collector that does not include openings.

Figure 25:
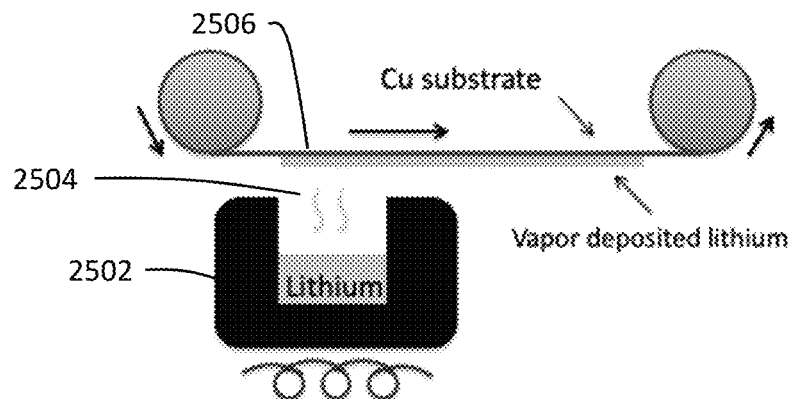
FIG. 25 illustrates an example vapor deposition system for applying an alkali metal to a current collector surface.

Anode structure with a thin alkali metal layer, e.g., a thickness below 30 um and large widths, e.g., between 55 mm to 800 mm or greater may be manufactured via vapor deposition of alkali metal on a current collector metal substrate in a roll-to-roll process as illustrated in FIG. 25. As shown, alkali metal may be melted in a crucible 2502 under partial pressure or inert atmosphere, and the vapor 2504 deposited on the current collector foil 2506 held above the crucible. Alkali metal vapor solidifies upon deposition on the current collector substrate and in some examples, the process is repeated on the other side of the current collector foil. A thickness of deposited alkali metal is determined by the duration of exposure to the vapor (roll speed) and a width of the deposited alkali metal is determined by the size of the crucible opening to the substrate.

Figure 26:
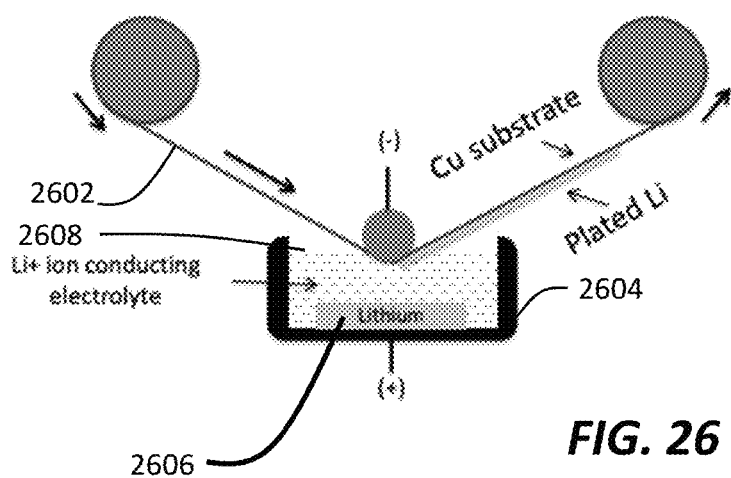
FIG. 26 illustrates an example electrodeposition system for applying an alkali metal to a current collector surface.
Figure 27:
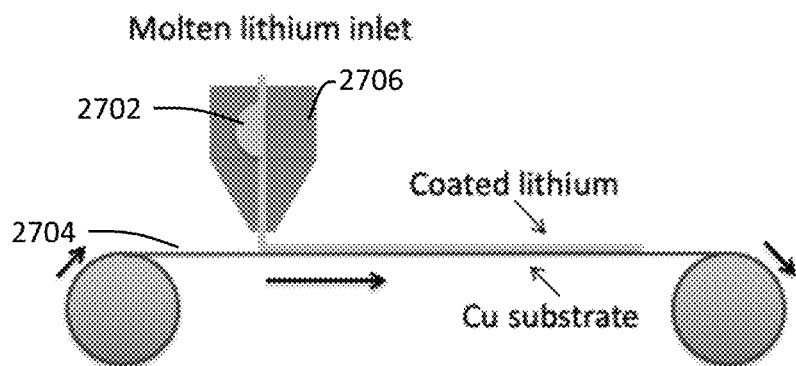
FIG. 27 illustrates an example slot-die coating system for applying an alkali metal to a current collector surface.

Anode structure with a thin alkali metal layer, e.g., a thickness below 30 um and large widths, e.g., between 55 mm to 800 mm or greater may also be made by electrodeposition of alkali metal on current collector substrate in a roll-to-roll process as shown in FIG. 26. Electrodeposition of alkali metal on a current collector foil substrate 2602 may be done in an electrochemical cell 2604 containing alkali metal 2606 as the positive electrode, current collector foil substrate 2602 as the negative electrode, and an alkali metal-ion conducting electrolyte 2608. Alkali metal-ion conducting electrolyte 2608 could be made, for example, by dissolving an alkali metal salt in non-aqueous solvent. A thickness of the deposited alkali metal on the current collector foil substrate 2602 is determined by the current density and duration of exposure to the electrolyte, and a width of the alkali metal deposited is determined by the width of the current collector substrate exposed to the electrolyte.

Anode structure with a thin alkali metal layer, e.g., a thickness below 30 um and large widths, e.g., between 55 mm to 800 mm or greater may also be made by coating molten alkali metal on a current collector substrate. Molten alkali metal 2702 can be coated on the current collector foil substrate 2704 via several roll-to-roll processes, such as, slot-die coating, dip coating, micro gravure, and flexography. FIG. 27 shows a schematic of slot-die coating of molten alkali metal on a current collector substrate. In the illustrated process, molten alkali metal 2702, e.g., lithium, is injected through a slot-die head 2706 and coated on one side of a current collector foil substrate 2704. Alkali metal solidifies upon coating on the substrate and the process may be repeated on the other side of the current collector foil. The thickness of the coated alkali metal on the current collector substrate is determined by the injection pressure & roll speed and the width of the alkali metal coated is determined by the slot-die head.

As noted above, in examples where an alkali metal foil is laminated to only one first side of a porous current collector, the second opposite side of the porous current collector may be coated with the alkali metal using any coating process known in the art, including any of the coating processes described and illustrated in connection with FIGS. 25-27, for example, during steps 1015 and/or 1017 (FIG. 10). In other examples, alkali metal foil can be laminated to both sides of any of the porous current collectors disclosed herein.

Any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 28:
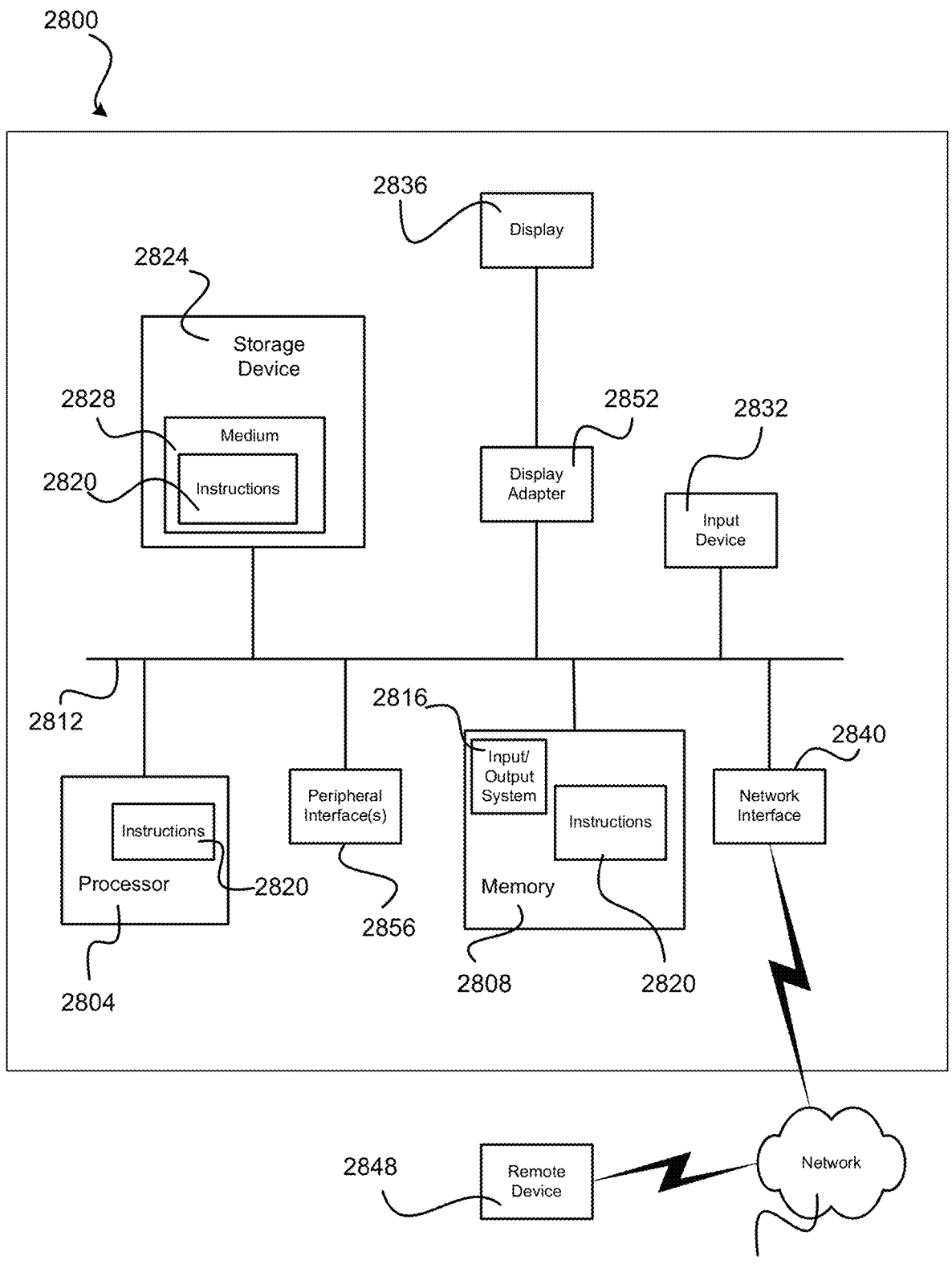
FIG. 28 shows a diagrammatic representation of one embodiment of a computing device for causing control systems to execute aspects of the present disclosure.

FIG. 28 shows a diagrammatic representation of one embodiment of a computing device in the exemplary form of a computer system 2800 within which a set of instructions for causing a control system, such as the roll-to-roll system 1200 system of FIG. 12, to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 2800 includes a processor 2804 and a memory 2808 that communicate with each other, and with other components, via a bus 2812. Bus 2812 may include any of several types of bus structures including, but not limited to, a memory bus, a memory controller, a peripheral bus, a local bus, and any combinations thereof, using any of a variety of bus architectures.

Memory 2808 may include various components (e.g., machine-readable media) including, but not limited to, a random access memory component, a read only component, and any combinations thereof. In one example, a basic input/output system 2816 (BIOS), including basic routines that help to transfer information between elements within computer system 2800, such as during start-up, may be stored in memory 2808. Memory 2808 may also include (e.g., stored on one or more machine-readable media) instructions (e.g., software) 2820 embodying any one or more of the aspects and/or methodologies of the present disclosure. In another example, memory 2808 may further include any number of program modules including, but not limited to, an operating system, one or more application programs, other program modules, program data, and any combinations thereof.

Computer system 2800 may also include a storage device 2824. Examples of a storage device (e.g., storage device 2824) include, but are not limited to, a hard disk drive, a magnetic disk drive, an optical disc drive in combination with an optical medium, a solid-state memory device, and any combinations thereof. Storage device 2824 may be connected to bus 2812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 2824 (or one or more components thereof) may be removably interfaced with computer system 2800 (e.g., via an external port connector (not shown)). Particularly, storage device 2824 and an associated machine-readable medium 2828 may provide nonvolatile and/or volatile storage of machine-readable instructions, data structures, program modules, and/or other data for computer system 2800. In one example, software 2820 may reside, completely or partially, within machine-readable medium 2828. In another example, software 2820 may reside, completely or partially, within processor 2804.

Computer system 2800 may also include an input device 2832. In one example, a user of computer system 2800 may enter commands and/or other information into computer system 2800 via input device 2832. Examples of an input device 2832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 2832 may be interfaced to bus 2812 via any of a variety of interfaces (not shown) including, but not limited to, a serial interface, a parallel interface, a game port, a USB interface, a FIREWIRE interface, a direct interface to bus 2812, and any combinations thereof. Input device 2832 may include a touch screen interface that may be a part of or separate from display 2836, discussed further below. Input device 2832 may be utilized as a user selection device for selecting one or more graphical representations in a graphical interface as described above.

A user may also input commands and/or other information to computer system 2800 via storage device 2824 (e.g., a removable disk drive, a flash drive, etc.) and/or network interface device 2840. A network interface device, such as network interface device 2840, may be utilized for connecting computer system 2800 to one or more of a variety of networks, such as network 2844, and one or more remote devices 2848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 2844, may employ a wired and/or a wireless mode of communication. In general, any network topology may be used. Information (e.g., data, software 2820, etc.) may be communicated to and/or from computer system 2800 via network interface device 2840.

Computer system 2800 may further include a video display adapter 2852 for communicating a displayable image to a display device, such as display device 2836. Examples of a display device include, but are not limited to, a liquid crystal display (LCD), a cathode ray tube (CRT), a plasma display, a light emitting diode (LED) display, and any combinations thereof. Display adapter 2852 and display device 2836 may be utilized in combination with processor 2804 to provide graphical representations of aspects of the present disclosure. In addition to a display device, computer system 2800 may include one or more other peripheral output devices including, but not limited to, an audio speaker, a printer, and any combinations thereof. Such peripheral output devices may be connected to bus 2812 via a peripheral interface 2856. Examples of a peripheral interface include, but are not limited to, a serial port, a USB connection, a FIREWIRE connection, a parallel connection, and any combinations thereof.

The foregoing has been a detailed description of illustrative embodiments of the disclosure. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this disclosure. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present disclosure. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this disclosure.

What is claimed is:

1. A method of manufacturing an anode, comprising:
   receiving an alkali metal foil;
   receiving a porous current collector foil having first and second opposing sides and a webbed structure defining openings each having a volume; and
   laminating the alkali metal foil and porous current collector foil together at the first side of the porous current collector, wherein the laminating includes forming extruded portions of the alkali metal foil that extend through the openings from the first side to the second side and that substantially fill the volumes of the openings.

2. The method of claim 1, wherein the laminating step includes completely filling the volumes with the extruded portions.

3. The method of claim 1, wherein the laminating step includes extending the extruded portions until they are at least substantially flush with the second side of the porous current collector foil.

4. The method of claim 1, wherein the openings in the porous current collector foil define a percent open area that is greater than 40%.

5. The method of claim 1, wherein the openings have a maximum width that is greater than 0.5 mm.

6. The method of claim 1, wherein the webbed structure of the porous current collector has a minimum web width extending between adjacent ones of the openings, wherein the minimum web width is less than 1 mm.

7. The method of claim 1, further comprising coating the second side of the current collector with an alkali metal coating.

8. The method of claim 7, wherein the step of coating includes one or more of vapor deposition, electrodeposition, slot-die coating, dip coating, micro gravure, flexography, or plating during initial charging of a cell containing the anode.

9. The method of claim 1, wherein alkali metal foil is laminated to only one side of the current collector metal foil.

10. The method of claim 1, wherein the alkali metal foil has a width that is greater than 55 mm.

11. The method of claim 10, wherein the laminating step includes laminating a plurality of rows of the alkali metal foil in a closely-spaced parallel arrangement across the porous current collector foil to form a wide-format anode having a width in the range of 55 mm to 300 mm.

12. The method of claim 1, wherein the alkali metal foil is a first alkali metal foil, the method further comprising laminating a second alkali metal foil and the porous current collector foil together at the second side of the porous current collector.

13. A secondary battery, comprising:
an alkali metal anode, a cathode, and a separator;
wherein the alkali metal anode was manufactured according to claim 1.

14. The method of claim 1, wherein the openings in the porous current collector foil include a plurality of identically sized polygonal openings arranged with one another so as to define uniform web widths within the porous current collector foil between adjacent one of the identically sized polygonal openings.

15. The method of claim 14, wherein the identically sized polygonal openings are hexagonal in shape.

16. The method of claim 14, wherein the openings in the porous current collector foil define a percent open area that is greater than 80%.

17. The method of claim 1, wherein the porous current collector foil has a thickness in a range of 4 μm to 20 μm and is secured to a carrier film.

18. The method of claim 1, further comprising, prior to receiving the porous current collector foil, forming the openings using a cutting process that uses multiple rollers, each having a plurality of punches or cutters, wherein the plurality of punches or cutters are offset relative to one another so as to make spacings among the openings smaller than distances between adjacent ones of the punches or cutters on any given one of the multiple rollers.

19. The method of claim 1, wherein the second side of the porous current collector foil is secured to a carrier film having openings in registration with the openings of the porous current collector foil, and the forming of the extruded portions of the alkali metal foil so that they extend into the openings of the carrier film.

20. The method of claim 19, further comprising:
removing the carrier film from the porous current collector foil so as to leave the extruded portions intact with the porous current collector foil; and
planarizing the extruded portions so as to form a continuous layer therefrom on the second side of the porous current collector foil.

21. The method of claim 1, further comprising, prior to receiving the porous current collector foil:
receiving a multilayer laminate composed of the porous current collector foil, a first carrier film adhesively secured to the second side of the porous current collector foil, and a second carrier film adhesively secured to the first carrier film opposite the porous current collector foil, wherein:
the first carrier film has openings in registration with the openings in the porous current collector foil; and
the openings in the porous current collector and in the first carrier film contain chads from forming the openings, the chads being adhesively secured to the second carrier film; and
removing, from the multilayer laminate, the chads by removing the second carrier film to which the chads are adhered.

22. The method of claim 1, wherein the openings in the porous current collector foil define a percent open area that is greater than 60%.

23. The method of claim 1, wherein the openings in the porous current collector foil define a percent open area that is greater than 80%.

24. The method of claim 1, wherein the openings have a maximum width that is greater than 0.75 mm.

25. The method of claim 1, wherein the openings have a maximum width that is greater than 1.2 mm.

26. The method of claim 1, wherein the webbed structure of the porous current collector has a minimum web width extending between adjacent ones of the openings, wherein the minimum web width is less than 0.25 mm.

27. The method of claim 1, wherein the webbed structure of the porous current collector has a minimum web width extending between adjacent ones of the openings, wherein the minimum web width is less than 0.15 mm.

28. The method of claim 1, wherein the openings in the porous current collector foil define a percent open area that is greater than 75% and have a minimum spacing of less than 0.2 mm.

29. The method of claim 1, wherein the openings in the porous current collector foil define a percent open area that is greater than 75%, have a size greater than 1.2 mm, and have a minimum spacing of less than 0.2 mm.

30. The method of claim 1, wherein the openings in the porous current collector foil are polygonal in shape, define a percent open area that is greater than 75%, have a size greater than 1.2 mm, and have a minimum spacing of less than 0.2 mm.

31. The method of claim 1, wherein the openings in the porous current collector foil are polygonal in shape, define a percent open area that is greater than 75%, and have a minimum spacing of less than 0.2 mm.

32. The method of claim 1, wherein the openings in the porous current collector foil are polygonal in shape and have a minimum spacing of less than 0.2 mm.

* * * * *